US005337262A

United States Patent [19]

Luthi et al.

[11] Patent Number: 5,337,262

[45] Date of Patent: Aug. 9, 1994

[54] APPARATUS FOR AND METHOD OF TESTING HYDRAULIC/PNEUMATIC APPARATUS USING COMPUTER CONTROLLED TEST EQUIPMENT

[75] Inventors: Jeffrey L. Luthi, Valencia; Richard Tauber, Granada Hills, both of Calif.

[73] Assignee: HR Textron Inc., Valencia, Calif.

[21] Appl. No.: 801,242

[22] Filed: Dec. 3, 1991

[51] Int. Cl.⁵ .............................................. G05B 23/00

[52] U.S. Cl. .................................... 364/580; 364/558; 364/550; 324/73.1; 73/168; 73/4 R; 73/40

[58] Field of Search ..... 73/168, 4 R, 11, 11.01–11.09, 73/40; 364/424.03, 424.04, 580, 483, 558, 550; 324/73.1; 371/22.1, 26

[56] References Cited

U.S. PATENT DOCUMENTS

| | | | |
|---|---|---|---|
| 4,089,058 | 5/1978 | Murdock | 364/571.04 |
| 4,426,683 | 1/1984 | Kissell | 364/550 |
| 4,480,464 | 11/1984 | Whisenand et al. | 73/40 |
| 4,512,179 | 4/1985 | Umble et al. | 73/4 R |
| 4,690,003 | 9/1987 | McNennamy et al. | 73/168 |
| 4,782,292 | 11/1988 | Gilfoy et al. | 324/73.1 |
| 4,841,456 | 6/1989 | Hogan, Jr. et al. | 364/550 |
| 4,916,641 | 4/1990 | Bybee | 364/550 |
| 4,976,144 | 12/1990 | Fitzgerald | 364/558 |
| 4,980,825 | 12/1990 | Tootell et al. | 364/580 |
| 4,993,259 | 2/1991 | LaFountain | 73/168 |
| 5,050,080 | 9/1991 | Abe | 364/424.04 |

OTHER PUBLICATIONS

Conference: IEEE AutoTest Con '81 Proceedings, Orlando, FL., USA (19–21 Oct. 1981).

*Primary Examiner*—Jack B. Harvey
*Assistant Examiner*—Hal D. Wachsman
*Attorney, Agent, or Firm*—Robbins, Berliner & Carson

[57] ABSTRACT

Automatic test equipment for testing hydraulic/-pneumatic devices which devices are included within the test system as well as those which may be attached to the test system. Object oriented programming preferably using C++ language is utilized. Abstract classes representative of characteristics of a group of devices to be tested are provided. Also provided are subclasses characteristic of types of units to be tested. Upon declaration of a specific instance of a type of unit to be tested, the abstract class is inherited into a subclass which in turn is incorporated into the unique characteristics for the declared unit to be tested. A test program is activated for the specific unit to be tested. The test program is also constructed by utilizing abstract and subclasses of information characteristic to the unit to be tested. As the test is being conducted, additional tests or devices within the system are addressed to permit utilization of the information so addressed or alternatively, communication with devices contained within the test system as required for conducting and completing the test on the unit under test.

14 Claims, 22 Drawing Sheets

FIG. 9
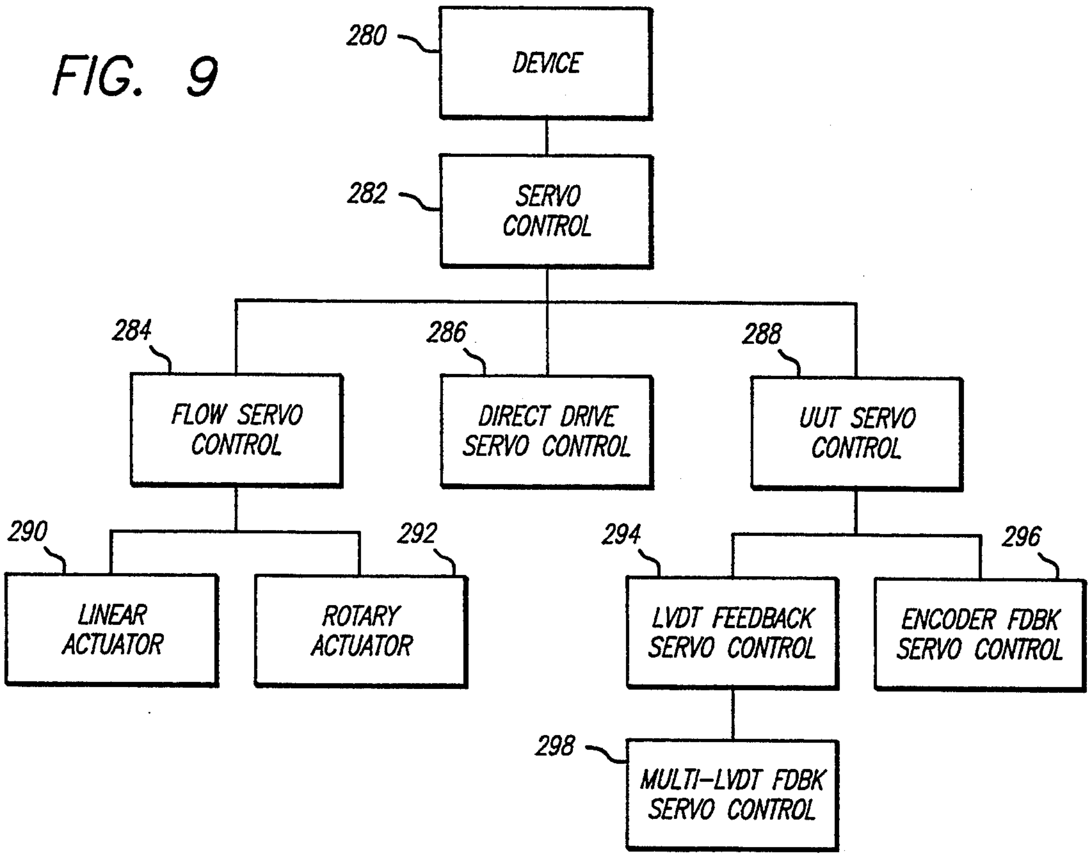
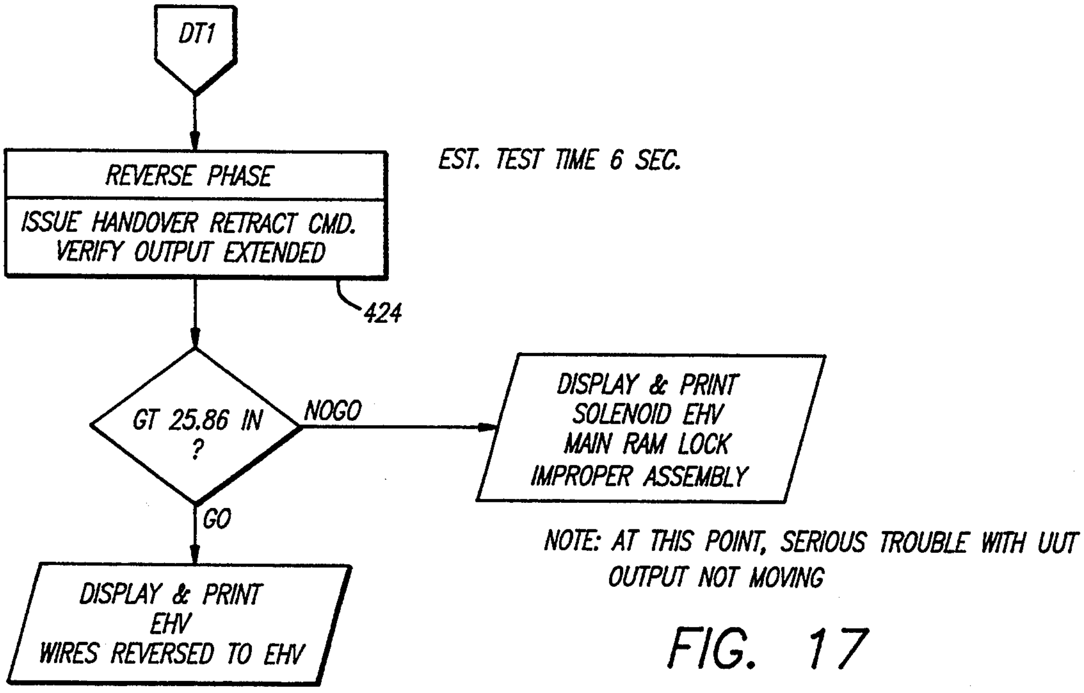
FIG. 17

APPARATUS FOR AND METHOD OF TESTING HYDRAULIC/PNEUMATIC APPARATUS USING COMPUTER CONTROLLED TEST EQUIPMENT

BACKGROUND OF THE INVENTION

1. Field of the Invention

This invention relates generally to the testing of hydraulic/pneumatic apparatus and more specifically to an apparatus and a method for testing such apparatus utilizing computer controlled automatic test equipment.

2. Prior art

It has been common practice in the art to test hydraulic/pneumatic component subsystems and systems (devices) subsequent to their assembly to ascertain whether such devices are operating in accordance with the specifications set forth for them. Such testing may occur at the time of manufacture of the device or subsequently during maintenance thereof. For example, it is typical to connect a hydraulic actuator to a test stand and determine its frequency response, external and internal leakage, proof pressure, ram travel and velocity, damping, hysteresis and the like.

In such prior art test stands, the device may be connected to dedicated ports for application of fluid under pressure and/or return thereto, or alternatively, connected arbitrarily to ports which can then be controlled by a computer through a manifold so that the desired pressure and return is then applied to the ports to which the device has been connected. One example of such a structure is that shown and described in U.S. Pat. No. 4,480,464, which is incorporated herein by reference. Subsequent to connection of the device, the system steps through a series of tests to ascertain whether or not the device is functioning according to its predetermined specifications. The tests may be performed in accordance with selections made by an operator's input or alternatively, in a manner controlled automatically by a computer controlled system. Examples of such computer controlled automatic testing systems are as shown and described in U.S. Pat. No. 4,782,292, which is incorporated herein by reference. In such systems, a computer control system automatically sequences through a plurality of tests specific to the device being tested, determines whether the device falls within the predetermined tolerances programmed within the system and thus, whether it has met the predetermined specifications or not.

A similar automatic testing structure is that as shown and described in U.S. Pat. No. 4,916,641 which is incorporated herein by reference. Such a system receives and stores a plurality of tables of data. Each such table contains data which is characteristic to the specific device being tested. Additional tables of data are also stored with each such additional table containing data which is characteristic of each transducer, amplifier or other component relating to the device to be tested. The table of characteristic data for each such transducer, amplifier or other component can then in effect be used by incorporating it into other definition tables. Thus for each such transducer, amplifier or other component there is developed a specific set of characteristic data which is then automatically referenced or used when desired and as controlled by the computer control system to test a particular device. Thus, when a specific device to be tested is identified, the computer will search out the tables containing the set of data characteristic to the device, to the transducers, the amplifiers and the other components as they use those data to test the device.

Although the prior art systems have worked quite well for the applications intended, it is evident that if there is any change in the hardware, either in the test stand or the device, then each of the tables of characteristic data must be changed to accommodate the same. Those skilled in the art will recognize that such changes can effect the overall operation of the system in that they must be incorporated into a plurality of different tables of characteristic data resulting in necessary changes in the system software. Such changes necessarily add to the expense for maintenance and operation of the system as well as introducing problems of reliability.

SUMMARY OF THE INVENTION

A method for automatically testing hydraulic/pneumatic devices which includes defining a plurality of characteristics common to all of a plurality of such devices and storing such characteristics; defining a plurality of characteristics which are specific to a single predetermined device and storing such specific characteristics; declaring said specific device for testing; retrieving from storage said specific characteristics for said specific device and also retrieving said common characteristics from storage; combining said common characteristics and said specific characteristics; activating a test program including said common and specific characteristics and testing said specific device; measuring the results of said test; comparing the results of said test with said specific and common characteristics and reporting whether said test results fall within said specific and common characteristics.

In accordance with a more specific aspect of the present invention, there is provided a test station which includes an electronic console interconnected with a hydraulic console with appropriate interconnections between the two for allowing the electronics control console through the utilization of the computer contained therein to control the hydraulic console for the purpose of configuring the same to perform tests both upon the electronic and hydraulic devices in the test station as well as upon devices to be tested which are connected to the test station. In conducting the tests upon the devices, the common characteristics applicable to an entire class of such devices are combined with the specific characteristics identifiable for a specific device to provide a test program for the specific device. The device is tested and the results of the test are provided at the electronic control console either visually or by way of hard copy printout or both as may be required in any specific instance.

BRIEF DESCRIPTION OF THE DRAWINGS

FIG. 9 is a diagram showing the hierarchy utilized in establishing characteristics for a device and more specifically for servocontrol devices;

FIG. 17 is a flow chart showing a diagnostic test; and

DETAILED DESCRIPTION

Figure 2:
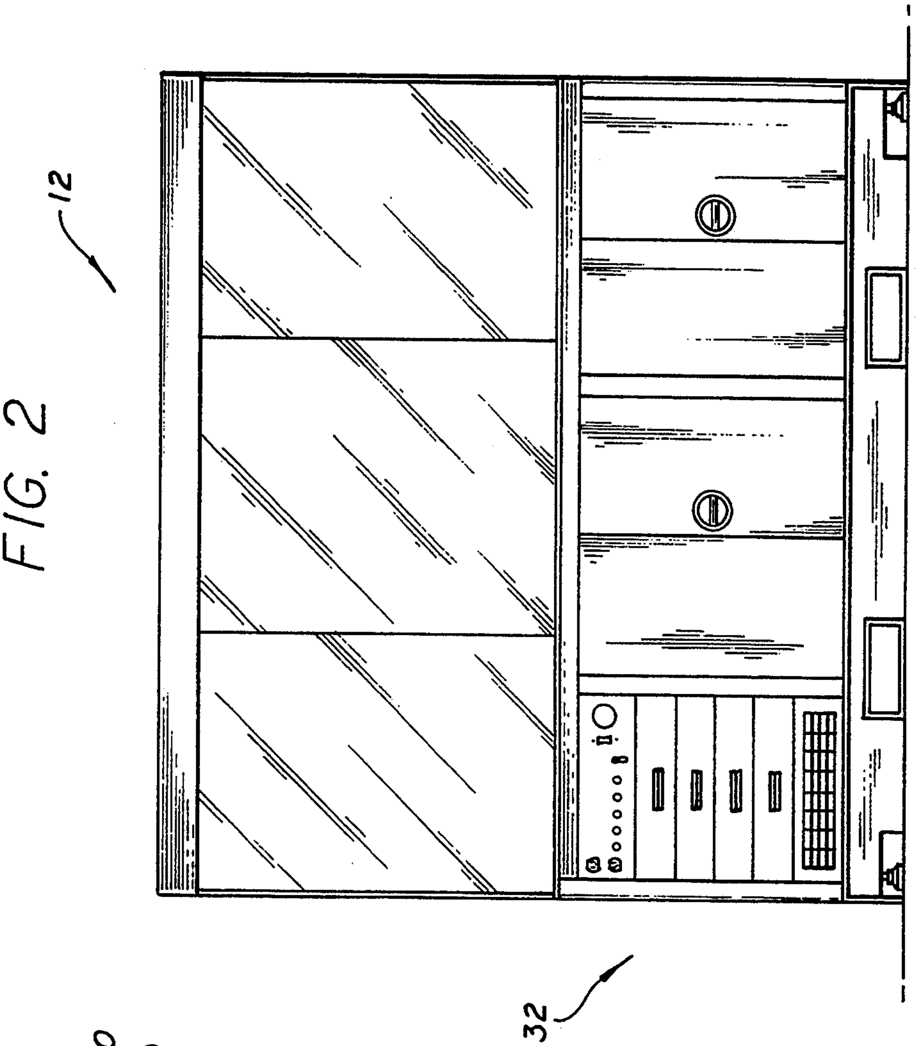
FIG. 2 is a front elevational view of the hydraulic console used in the automatic test equipment.

The automatic test equipment system of the present invention includes both hardware and software which together provide the ability to automatically test, through utilization of a computer, various hydraulic/-pneumatic components, subsystems and systems. The automatic test equipment provides the capability of testing such parameters as flow control, pressure control, sensor excitation, frequency response, external and internal leakage, proof pressure, hysteresis, ram travel, velocity, damping, and others well known to those skilled in the art.

The system provides the capability of accommodating hardware changes in either the test equipment or the devices to be tested without a major redesign of the software utilized to accomplish the test. This is accomplished by partitioning the software into a hierarchy of classes associated with a group of devices (units under test and the automatic test equipment) which are to be tested. The hierarchy is based upon the most general characteristics of the devices which are applicable to all the devices within the group (abstract base class) followed by further classifications of a less general nature (sub classes) descending to those characteristics specific to only one particular device (a class). When the operator then makes the decision to test a specific device and identifies it (an instance of the class or object), a test for that specific device is formulated by inheriting all of the characteristics relating to that device found in the hierarchy of classes of characteristics ascending to the most general such classification. It can thus be seen that where there are a large number of specific devices to be tested, there is no need or requirement to have provided a full list of characteristics attributable to each such specific device. Rather by identifying a specific device as falling within the overall group for which the hierarchy of classifications of characteristics has been established, one need only then inherit from all of the higher order of classes of characteristics into those characteristics which are specific to the identified device to accomplish the testing. Also, if a new device is to be added to the system for testing, only those characteristics unique to that specific device and not found in any of the higher order classifications of characteristics need be added and identified for that specific device.

To accomplish the foregoing, object-oriented design was chosen since it is a method which leads to software architectures based on the objects the system or subsystem manipulates (rather than the function it is meant to perform). Object-oriented design is the construction of software systems as structured collections of abstract data type implementations. For a more detailed discussion, reference is hereby made to "*Object-Oriented Software Construction*" by Bertrand Meyer, published by Prentice Hall 1988. The language chosen to implement the object-oriented design, is C++. For a more detailed discussion of the C++ language, reference is hereby made to the "*Annotated C++ Reference Manual*" by Margaret A. Ellis and Bjarne Stroustrup, published by Addison Wesley 1990. The object-oriented design along with the C++ language requires modularization based upon data. Prior art modularization was based upon function and this, in turn, caused similar data to be scattered throughout many parts or modules of the system.

Through the utilization of such a technique, automatic computer controlled testing of hydraulic/-pneumatic devices can be accomplished much quicker and in a more reliable and less expensive way than has heretofore been possible in the prior art.

Figure 1:
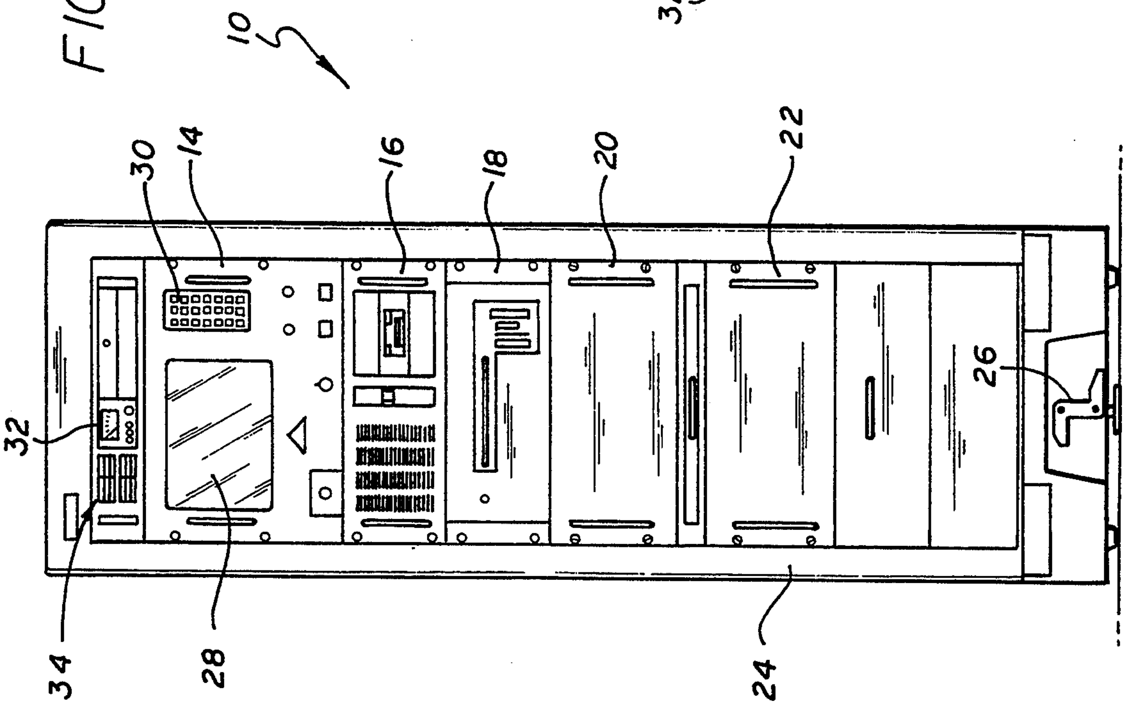
FIG. 1 is a front elevational view of an electronic control console which is part of the automatic test equipment used in practicing the method of the present invention.
Figure 3:
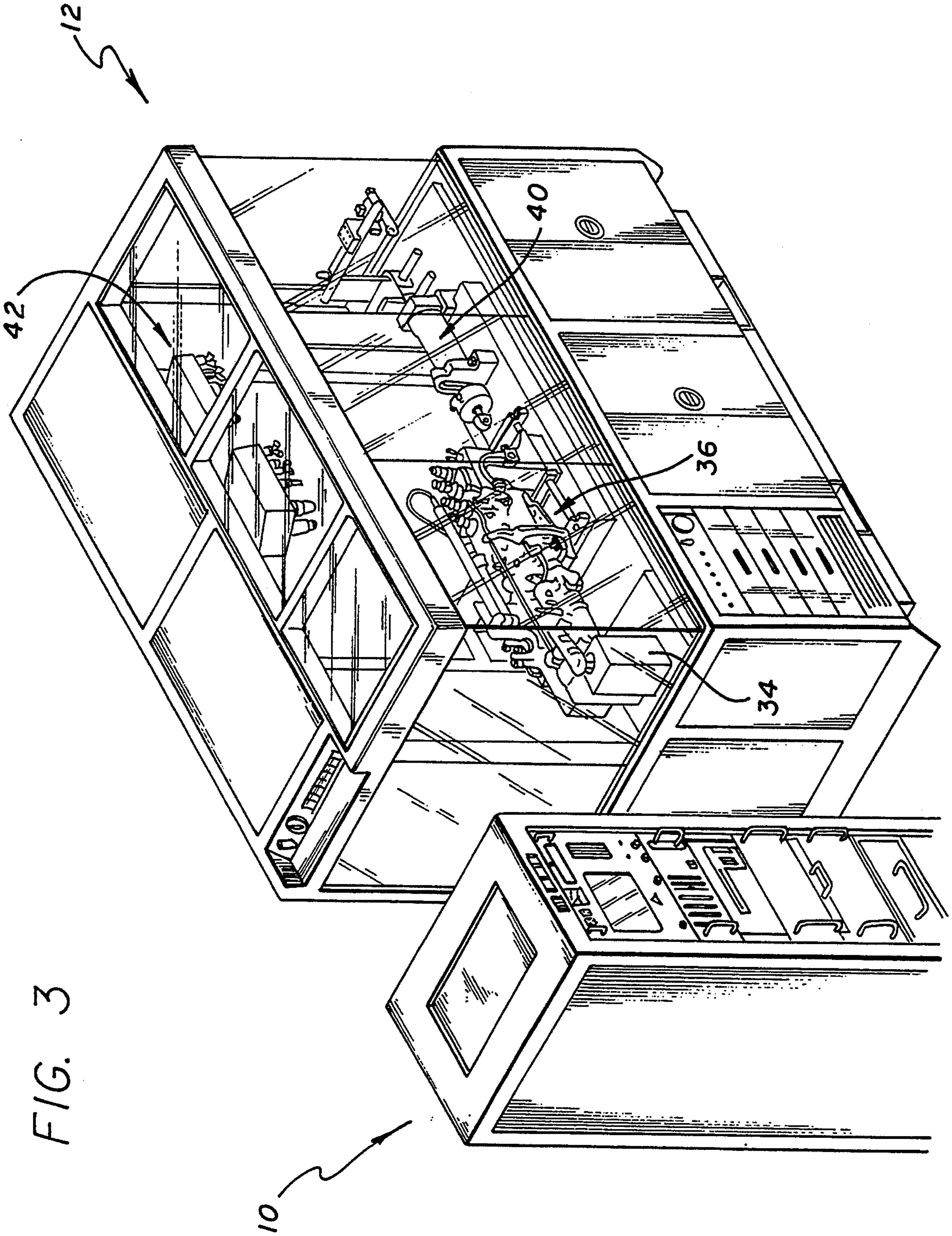
FIG. 3 is a perspective view showing the consoles of FIGS. 1 and 2 in operational position.

By reference now to FIGS. 1-3, there is shown an automatic test equipment test stand constructed in accordance with the principals of the present invention. The test stand includes an electronic control console 10 and a hydraulic console 12. The two consoles are electronically interconnected to provide communications therebetween so that the electronic control console can, upon appropriate instructions from an operator, activate the hydraulic console and carry out the steps required to test a device which is connected to the hydraulic console. As is typical in devices of this type, the electronic control console includes a programmable alternating current power supply 34 having a voltage meter 32, an operating interface panel 14, a microcomputer 16, a printer 18 and a pair of drawers 20 and 22 which contain appropriate printed wiring based assemblies (PWBA), i.e. printed circuit cards, for the instrument and control interface and the flight control electronic interface when the system is utilized to test flight control electrohydraulic/pneumatic flight control components, subsystems and systems. The various components of the electronic control console are removably mounted in a rack 24 which in turn may be positioned within an appropriate overall test station assembly by utilization of a locking device 26.

As is well known to those skilled in the art, the operating interface panel includes a cathode ray tube output device 28 and a keypad 30.

The hydraulic console 12 contains the appropriate electrical control panels 32 which communicate electronically with the electronic console and in turn interface with the various portions of hardware contained within the hydraulic console to provide the test. The hydraulic console contains such hydraulic and electromechanical devices as the solenoid valves, servovalves, pumps, motors, pressure and flow transducers, a sink, manifolds, and the fixtures that hold, instrument control and apply loads to the devices that are being tested during the testing process. For example, as shown more specifically in FIG. 3, a fixture 34 is provided to receive a linear actuator 36 which can be caused to move through various steps during the testing process under control of a test program activated and sequenced by the electronic control console. As the actuator 36 is placed through its test, signals are generated at the hydraulic console indicative of the test results. These signals are then transmitted back to the electronic control console for appropriate comparison and recording as the case may be. There is also provided on the hydraulic console 12, a fixture 38 which receives a rotary servoactuator which may be tested in a similar manner. Appropriate hydraulic ports 42 are provided for interconnection between the hydraulic fluid source and the devices such as 36 during the test. Appropriate manifolds and control devices are housed within the hydraulic console 12 which, under control of the electronic control console and the panel 32 on the hydraulic console, provide the various transducers, pumps and the like and their operation to provide the desired fluid under pressure to the devices such as 36 being tested. This is more fully explained in U.S. Pat. No. 4,480,464 to which reference is hereby made for a complete understanding by those skilled in the art.

Figure 4:
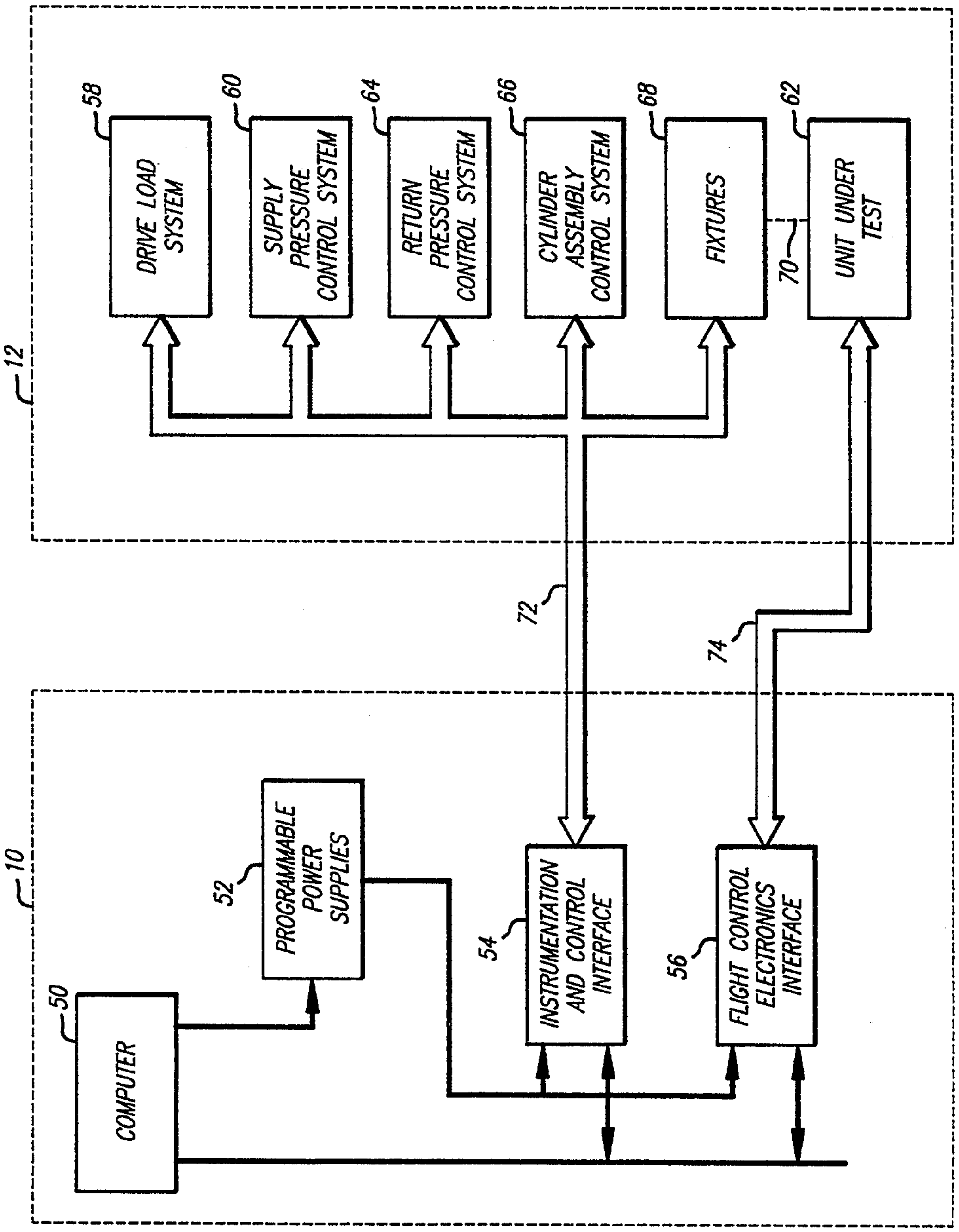
FIG. 4 is a block diagram illustrative of the interconnection in a generalized way of the electronic and hydraulic consoles.

Referring now more particularly to FIG. 4, there is disclosed a generalized block diagram illustrative of the overall automatic test equipment system and the interconnections between the electronic control console and the hydraulic console. As is therein shown, the electronic control console 10 includes a computer 50 which is utilized to control the overall automatic test equipment system. The computer is utilized to automatically test various types of hydraulic/pneumatic component subsystems and systems, for example, such as the flight control actuators on modern military and commercial aircraft including both rotary and linear actuators. The testing can be directed to the unit under test (UUT), a self test of the automatic test equipment or calibration tests on the automatic test equipment. Diagnostic tests can also be conducted on the UUT and on the automatic test equipment in the event of a failure. The computer controls a source of electrical power such as the programmable power supplies 52 which are then utilized to apply the appropriate level of voltage and current through the various components throughout the system as may be required. Appropriate interfaces between the electronic control console and the hydraulic control console such as the instrumentation and control interface 54 and the flight control electronics interface 56 are provided.

Within the hydraulic console 12 there is contained the drive load system 58 which is utilized to apply an appropriate load to the unit under test as may be desired. The supply pressure control system 60 is utilized to provide the appropriate fluids such as hydraulic fluid at the desired pressures and flow rates to the unit under test 62. The return pressure control system 64 is utilized to provide the appropriate pressure for the return flow from the unit under test. A cylinder assembly control system 66 is utilized for controlling application of tests to one type of UUT which includes a cylinder assembly. Appropriate fixtures 68 are utilized upon which the UUT is mounted to provide support for the UUT during tests. The mechanical interconnection between the UUT 62 and the fixture 68 is shown by the dash line 70 therebetween.

As is indicated by the paths 72 and 74, there is appropriate communication between the electronic control console and the hydraulic console so that appropriate commands for conducting the tests on the UUT or on the hydraulic console can be communicated from the computer through the appropriate interfaces to the hydraulic console and in turn, data and information concerning the hydraulic console and the UUT can be transmitted back to the computer for appropriate operations such as comparisons, logging, printout and the like. As can be seen by the interconnections, the instrumentation and control interface 54 through the appropriate path 72 controls the hydraulic console while the flight control electronics interface 56 through the path 74 controls the UUT.

Figure 5A:
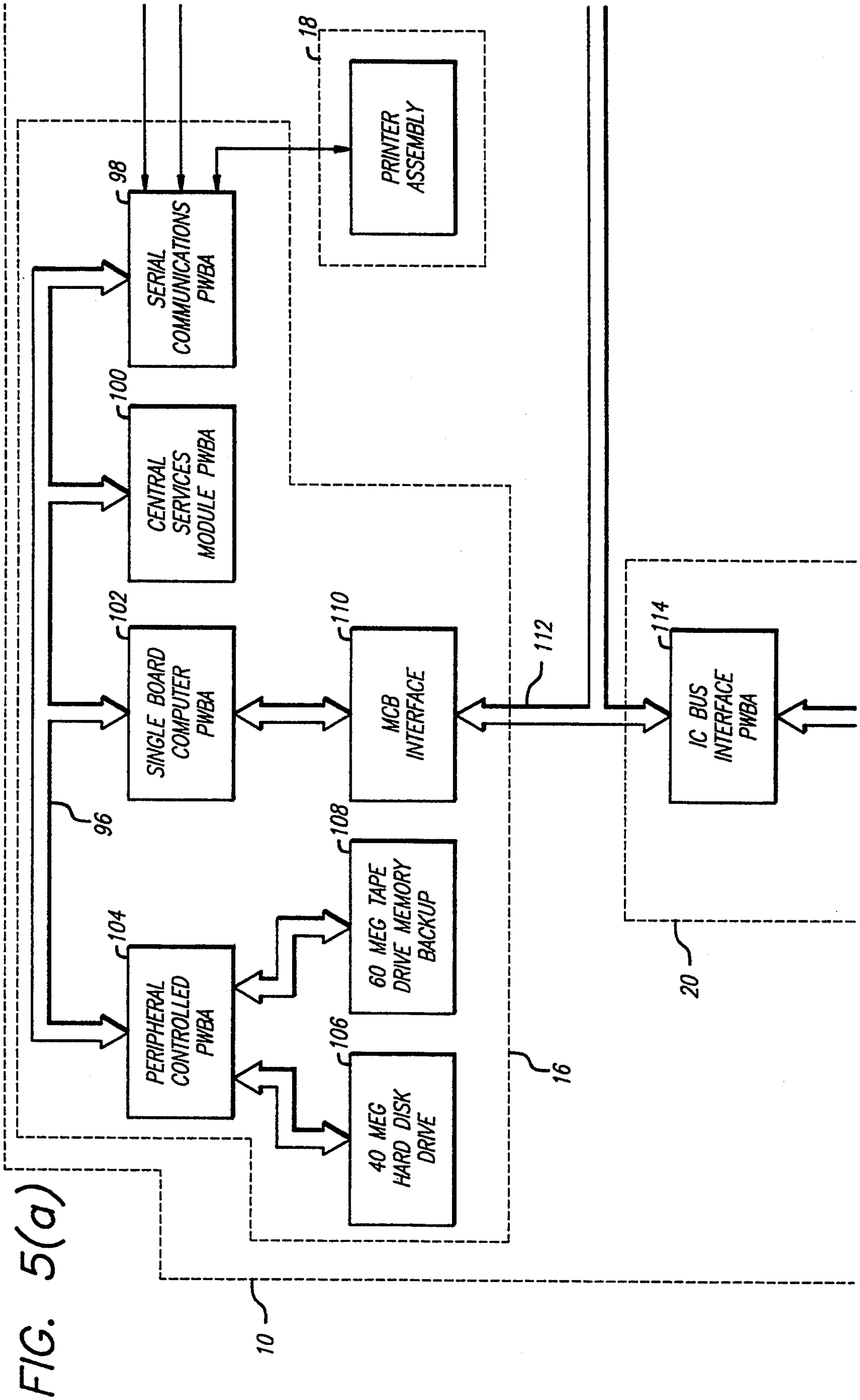
FIGS. 5(*a*)-(*f*) are more detailed block diagrams of a system used in conjunction with the present invention including a device to be tested and connected thereto.
Figure 5B:
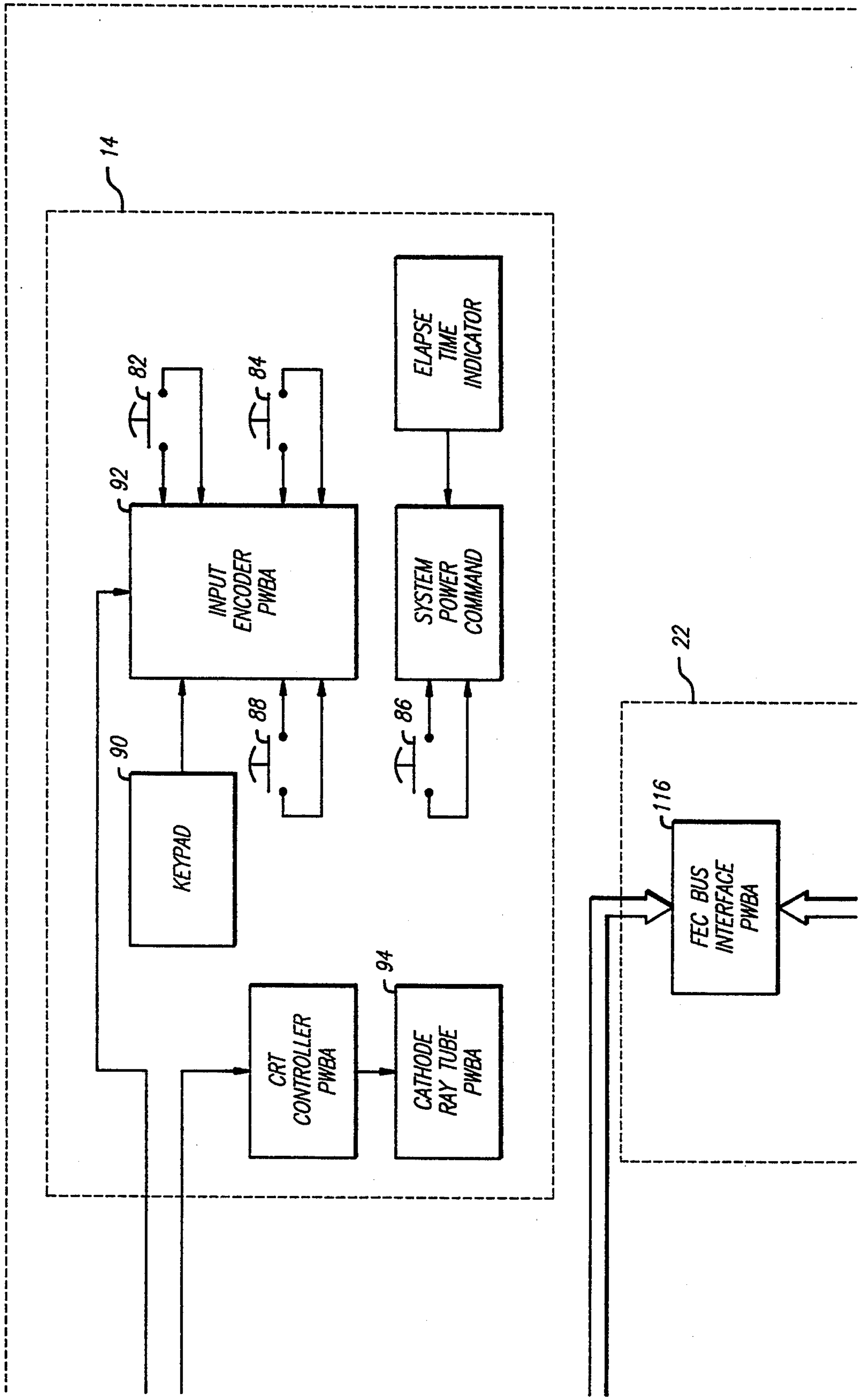
Figure 5C:
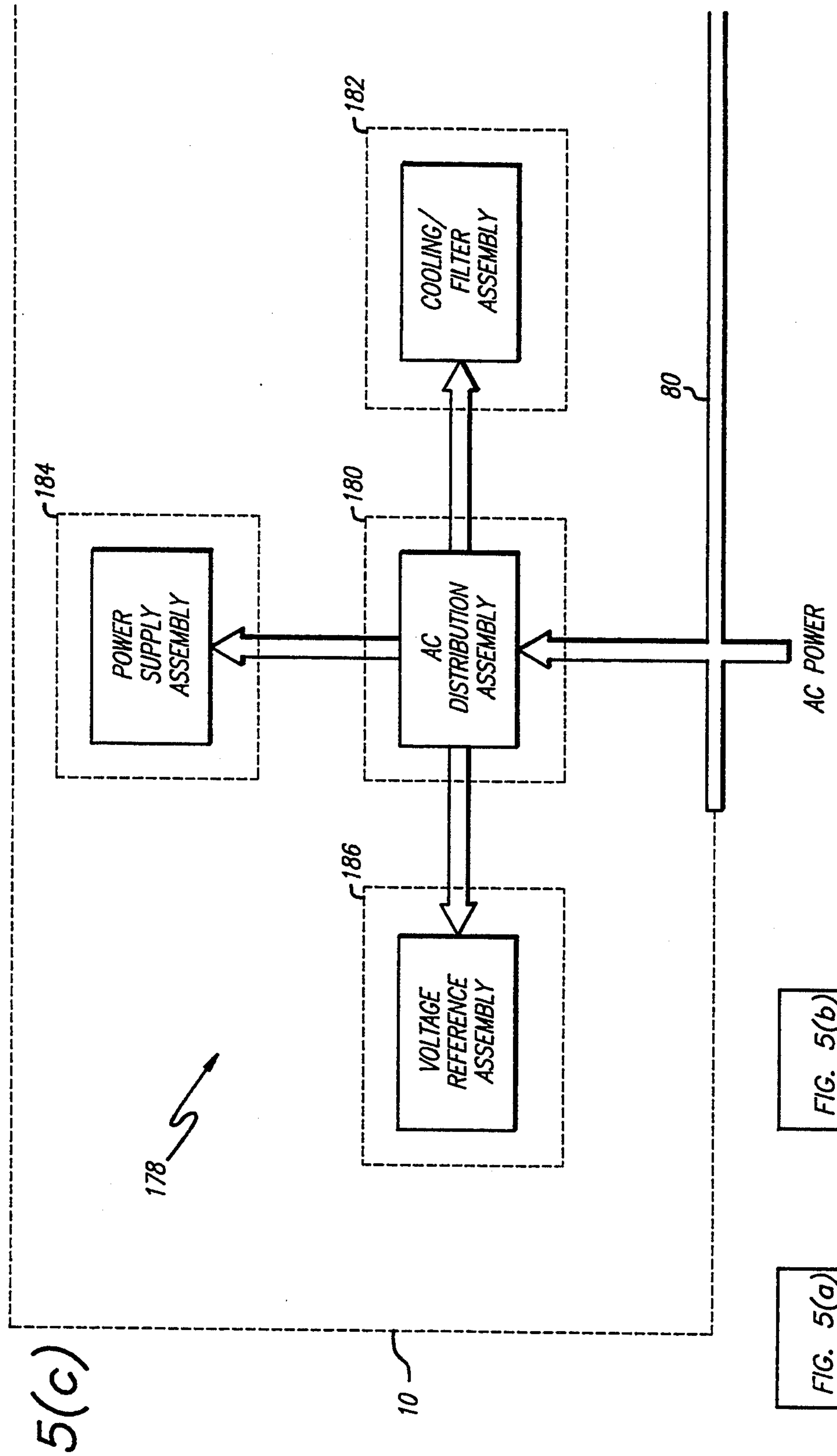
Figure 5:
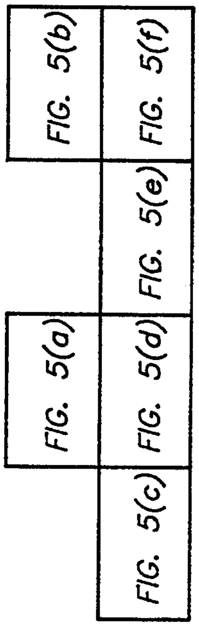
Figure 5D:
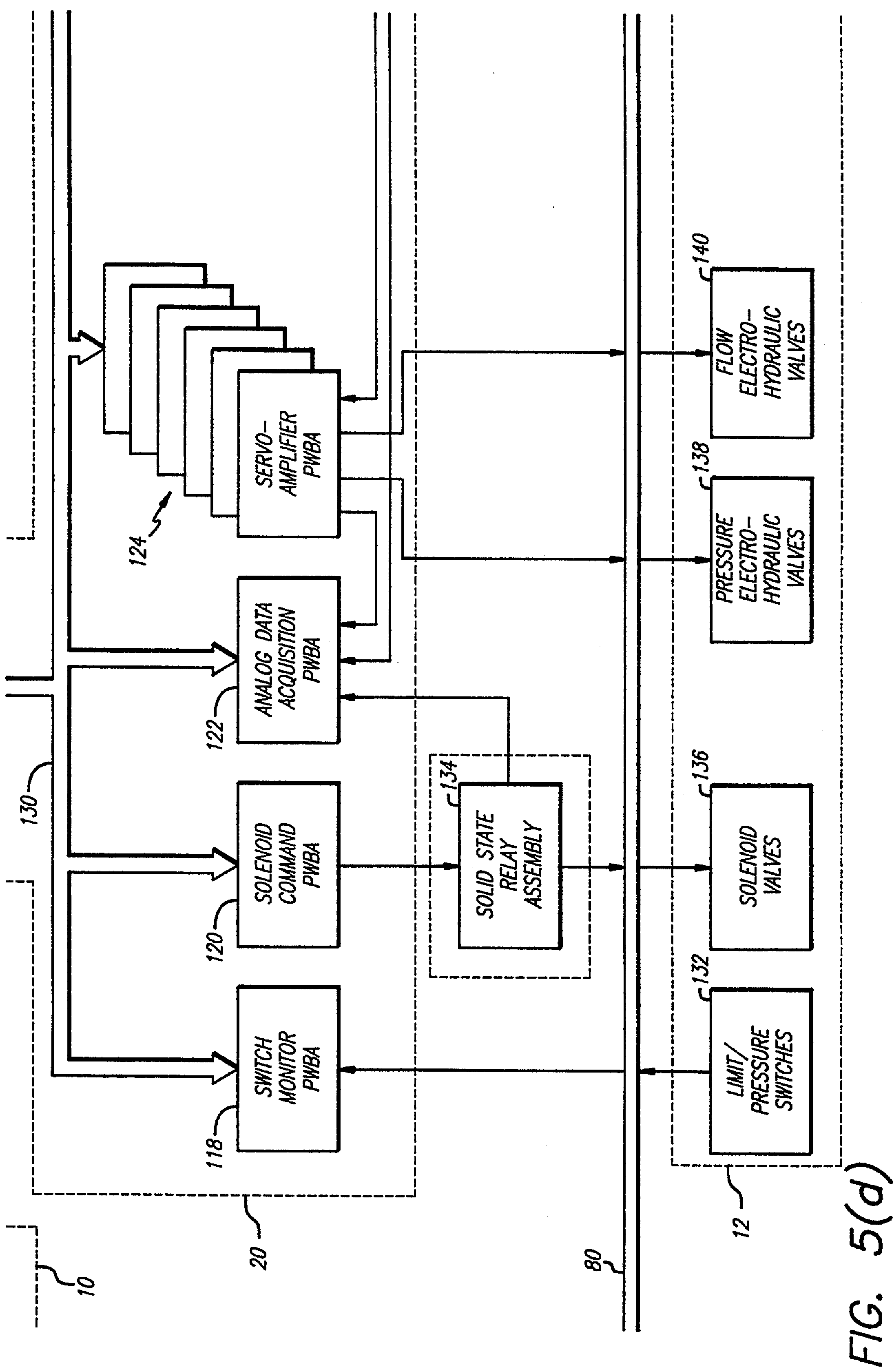
Figure 5E:
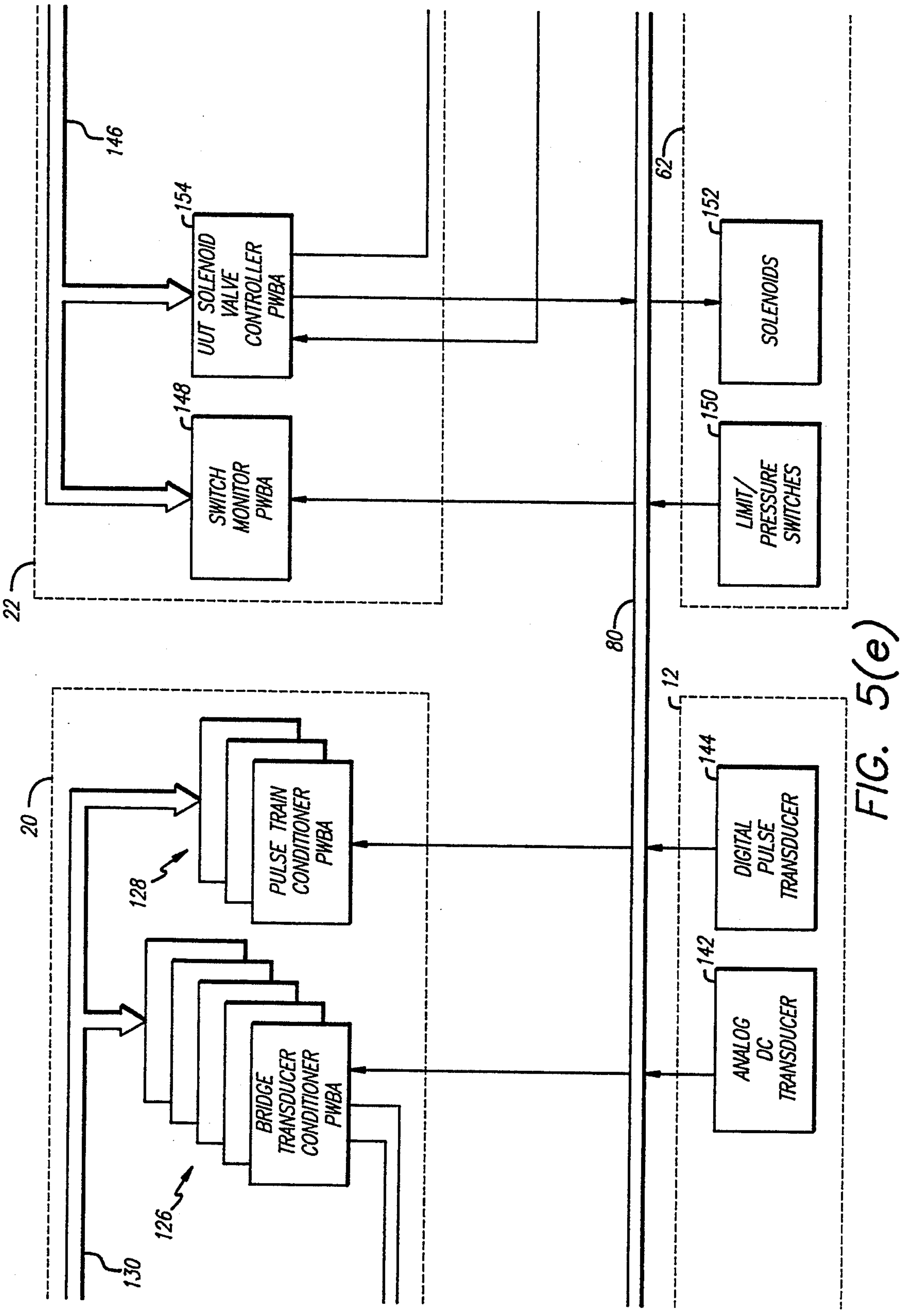
Figure 5F:
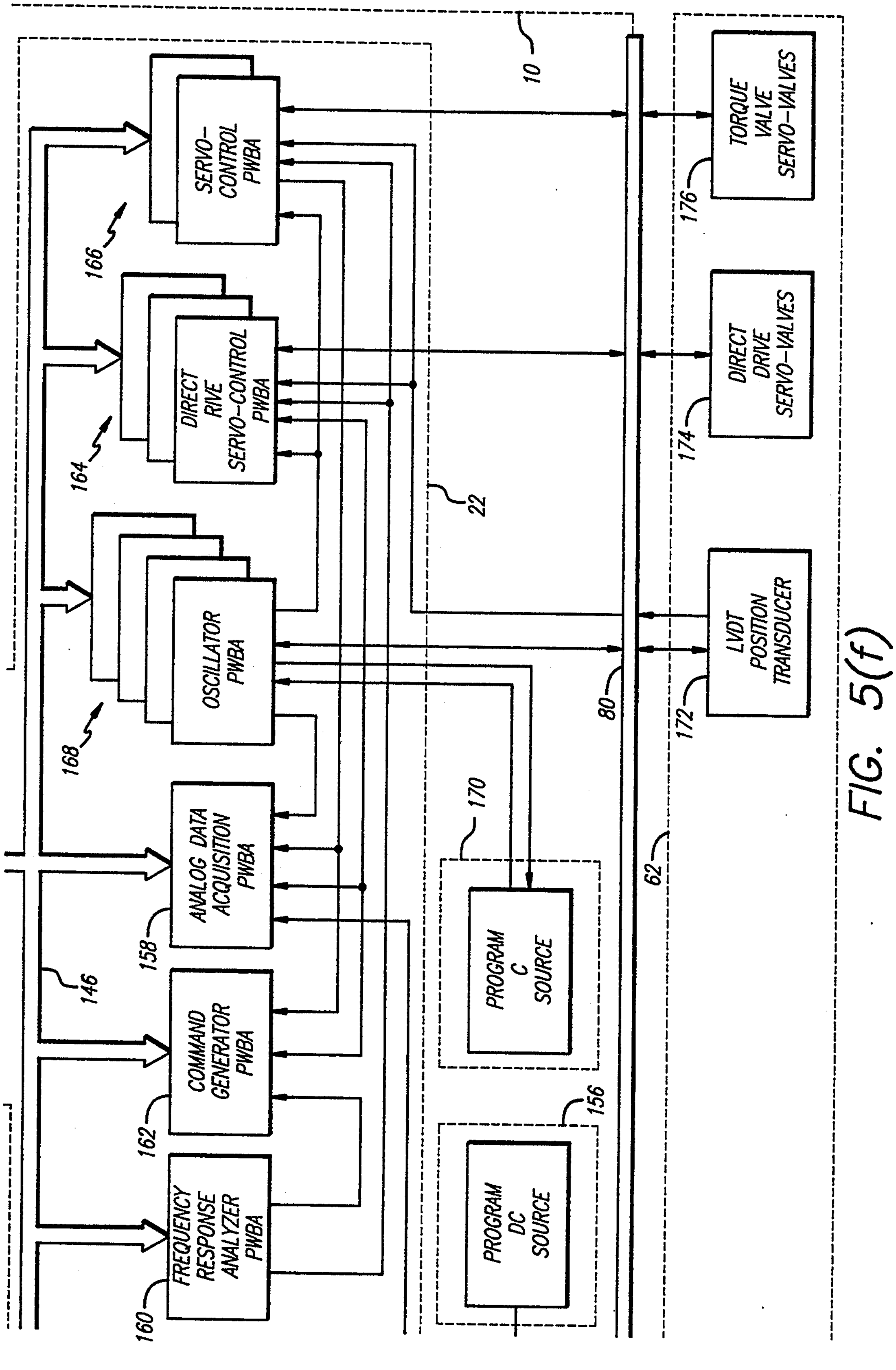

By reference now more specifically to FIGS. 5(*a*)–(*f*), more detailed block diagrams of the system as shown in FIG. 4 is provided. As is therein shown, the electronic control console 10 is interconnected to the hydraulic console 12 through the utilization of the input/output connector panel 80 which also provides interconnection to the UUT 62. As was noted in conjunction with the description of FIG. 1, the electronic control console includes the operator interface panel 14, the microcomputer system 16, the printer 18, the instrumentation and control interface 20 and the flight control electronics interface 22.

The operator interface panel 14 contains the typical control switches such as a power switch 82, a system reset switch 84 and an emergency stop switch 86. Also is provided a manual pump control switch to energize or de-energize the hydraulic pump in the hydraulic console should such be desired. An appropriate operator keypad 90 is utilized to allow the operator to input instructions, orders, data, or other commands to the computer as may be desired. The key input encoder printed wiring board assembly (PWBA) 92 is used for communicating between the operator interface panel and the microcomputer system 16. Also located in the operator interface panel 14, is the cathode ray tube 94 which is utilized to display information to the operator, such as the test being run, the status of the test, the results of the test, and the like. An appropriate cathode ray tube controller PWBA, is utilized to communicate between the computer and the operator interface panel.

A printer assembly 18 is connected to the computer system and is utilized to provide a hard copy of the test results on an appropriate UUT, when such is desired or commanded by the operator or automatically commanded by a particular test.

The microcomputer 16 is a standard state-of-the-art microcomputer system. Such for example, as an Intel multi-bus II. However, a ruggedized IBM-AT compatible system may preferably be substituted. As is illustrated in FIGS. 5(*a*) and (*b*), the computer 16 includes a bus 96 for communication between the various portions of the system. As is illustrated, there are provided a serial communications PWBA 98, a central services module PWBA 100, a single board computer PWBA 102 and a peripheral controlled PWBA 104. The peripheral controller in turn communicates with a 40 megabyte hard disc drive 106 as well as a 60 megabyte tape drive memory backup 108. A microcomputer bus interface (PWBA 110) is interconnected by the ECC system bus 112 to the instrumentation control bus interface PWBA 114 as well as the flight control electronics bus interface PWBA 116.

The instrumentation and control interface assembly (ICI) 20 is a drawer as shown in FIG. 1 which contains a plurality of printed wiring board assemblies (PWBA) such as illustrated in FIGS. 5(*a*), (*b*) and (*d*-*f*). In one specific application, the PWBA in the ICI drawer 20 would be a switch monitor 118, a solenoid command 120, an analog data acquisition 122, a plurality of servoamplifier PWBA 124, a plurality of bridge transducer conditioner PWBA 126, and a plurality of pulse train conditioner PWBA 128. Each of these communicates through the ICI bus interface PWBA with the ICI bus 130 so that appropriate commands can be received from the computer system 16 for application to the desired components within the ICI.

As is illustrated particularly in FIGS. 5(*a*)-(*f*), the ICI 20 functions to control the hydraulic console 12 and the various components contained therein, the connection being through the I/O connector panel 80. As is illustrated, the switch monitor PWBA 118 communicates with the limit/pressure switches 132 in the hydraulic console 12. The solenoid command PWBA 120 communicates through a solid state relay assembly 134 with solenoid valves 136. The solid state relay assembly 134 also communicates with the analog data acquisition PWBA 122 to provide information as to the state of the solenoid valves 136. The pressure electrohydraulic valves 138, which control the pressure of the fluid to be applied to the UUT, communicate with the servoamplifier PWBA 124, as do the flow electrohydraulic valves 140 which control the flow of fluid to the UUT.

There are numerous transducers which are of the analog direct current type shown at 142 in the hydraulic console 12. These analog d.c. transducers 142 communicate with the bridge transducer conditioner PWBA 126 which in turn communicate with the servo amplifier PWBA and the analog data acquisition PWBA to provide the appropriate controls to the pressure and flow valves 138 and 140 as well as the desired information concerning the status of the transducers for application to the microcomputer system 16.

Additional transducers of the digital pulse type as shown at 144, communicate with the pulse train PWBA 128 so that appropriate information may be provided to the computer system 16.

The flight control electronics interface assembly (FCEI) 22 as is shown in FIG. 1, is again a drawer similar to the ICI drawer 20 which contains a plurality of PWBA. The PWBA communicate with the FCEI bus interface PWBA 116 through the FCEI bus 146. As is illustrated on FIGS. 5(*a*)-(*f*), the FCEI controls the UUT which is coupled to the automatic test equipment through the I/O connector panel 80. As is more clearly illustrated and discussed with regard to FIG. 3 above, the UUT will be mounted on a fixture disposed within the hydraulic control console 12 with appropriate hydraulic and electrical connections made to the UUT so that it may be caused to sequence through a plurality of tests controlled by the computer 16 to determine whether or not the UUT is functional.

Disposed within the FCEI drawer 22 is a switch monitor PWBA 148 which communicates with limit pressure switches 150 in the UUT. Solenoids 152 in the UUT communicate with a UUT solenoid valve controller PWBA 154 in the FCEI. A programmable source of direct current 156 is connected to the UUT solenoid valve controller PWBA 154 to provide the appropriate energization to the solenoids 152 in the UUT 62. The UUT solenoid valve controller PWBA 154 also provides information to the analog data acquisition PWBA 158 to communicate the status of the solenoids to the computer system 16. Also provided is a frequency response analyzer PWBA 160 which communicates with the command generator PWBA 162, the direct drive servocontrol PWBA 164 and the servocontrol PWBA 166. In addition, the oscillator PWBA 168 communicate with a programmable source of alternating current 170.

Depending upon the particular UUT which is connected to the hydraulic console for testing, there may be LVDT position transducers which are typically associated with linear servoactuators. There may also be direct drive servovalves which have appropriate feed back position indicators associated therewith and there may also be torque motor servovalves 176 which also have appropriate feedback position indicators associated therewith. As is illustrated, the direct drive servocontrol PWBA 164 communicate with the direct drive servovalve 74, the servocontrol PWBA 166 communicate with the torque motor servovalves 176 as well as the LVDT position transducers 172. As will also be noted, in the event that the direct drive servoactuator also includes LVDT, the position transducers would be associated as needed with the oscillator PWBA as well as the servocontrol PWBA.

From the foregoing, it will be understood by those skilled in the art that the automatic test equipment constructed in accordance with the principles of the present invention, may communicate directly from the microcomputer system through the appropriate busses, the ICI and FCEI, to the hydraulic console and the UUT to automatically sequence through a series of preprogrammed tests to determine the functionality of the UUT. The particular tests to be initiated and sequenced are chosen by the operator through the utilization of the operator interface panel through identification of the particular UUT that is to be tested. As will become more apparent hereinafter, the operator may choose the type of test as well as the presentation of the results of the test and the like.

As will also be apparent to those skilled in the art, there is also provided access to electrical power to power the equipment contained in the automatic test equipment as is illustrated schematically at 178. As is therein shown, the alternating current power is applied to the alternating current distribution assembly 180 which in turn applies power to the cooling/filter assembly 182, the power supply assembly 184 and the voltage reference assembly 186 all as will be clearly understood by those skilled in the art.

Figure 6A:
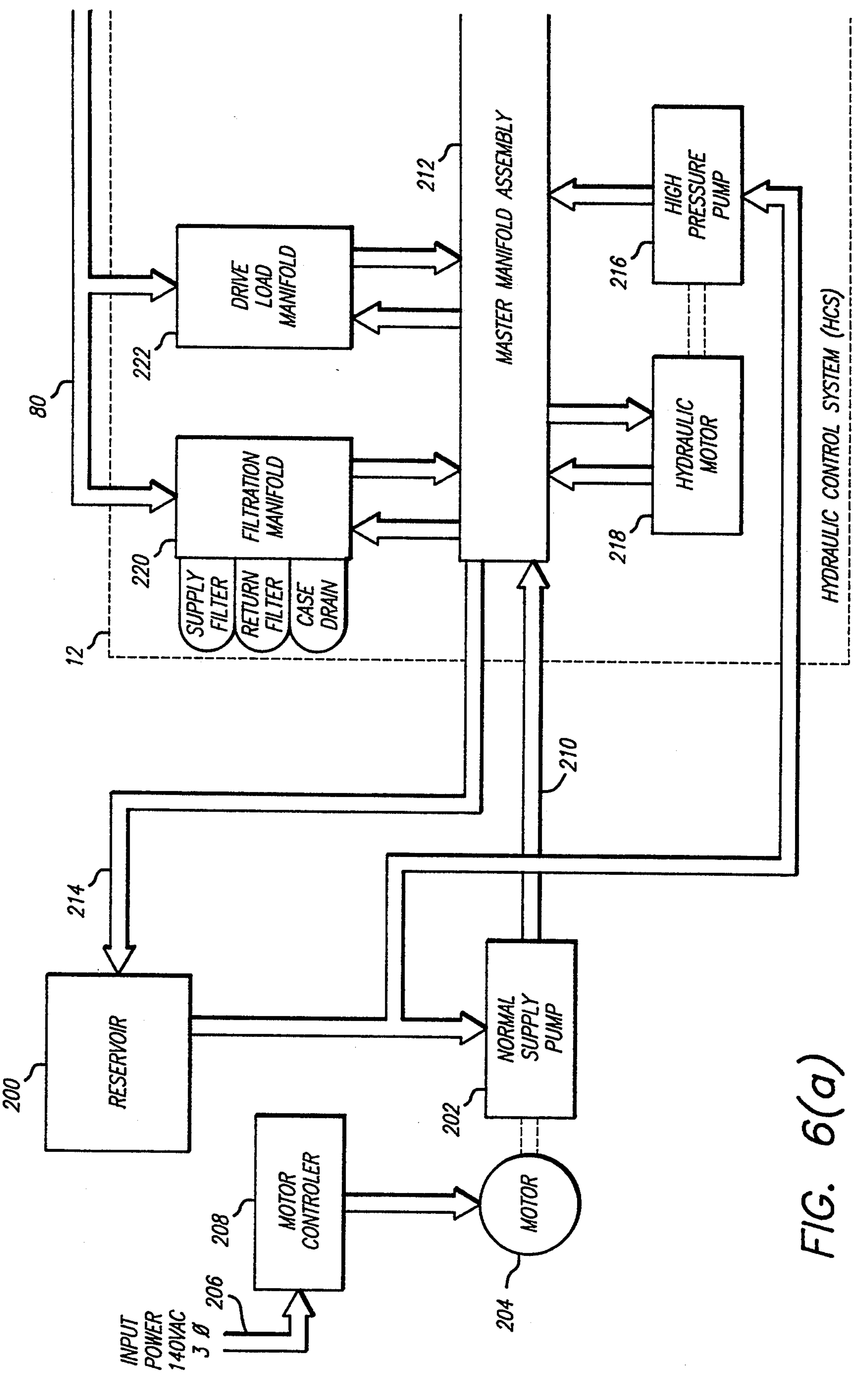
FIGS. 6(*a*) and (*b*) are block diagrams showing the hydraulic control system utilized in the hydraulic control console.
Figure 6B:
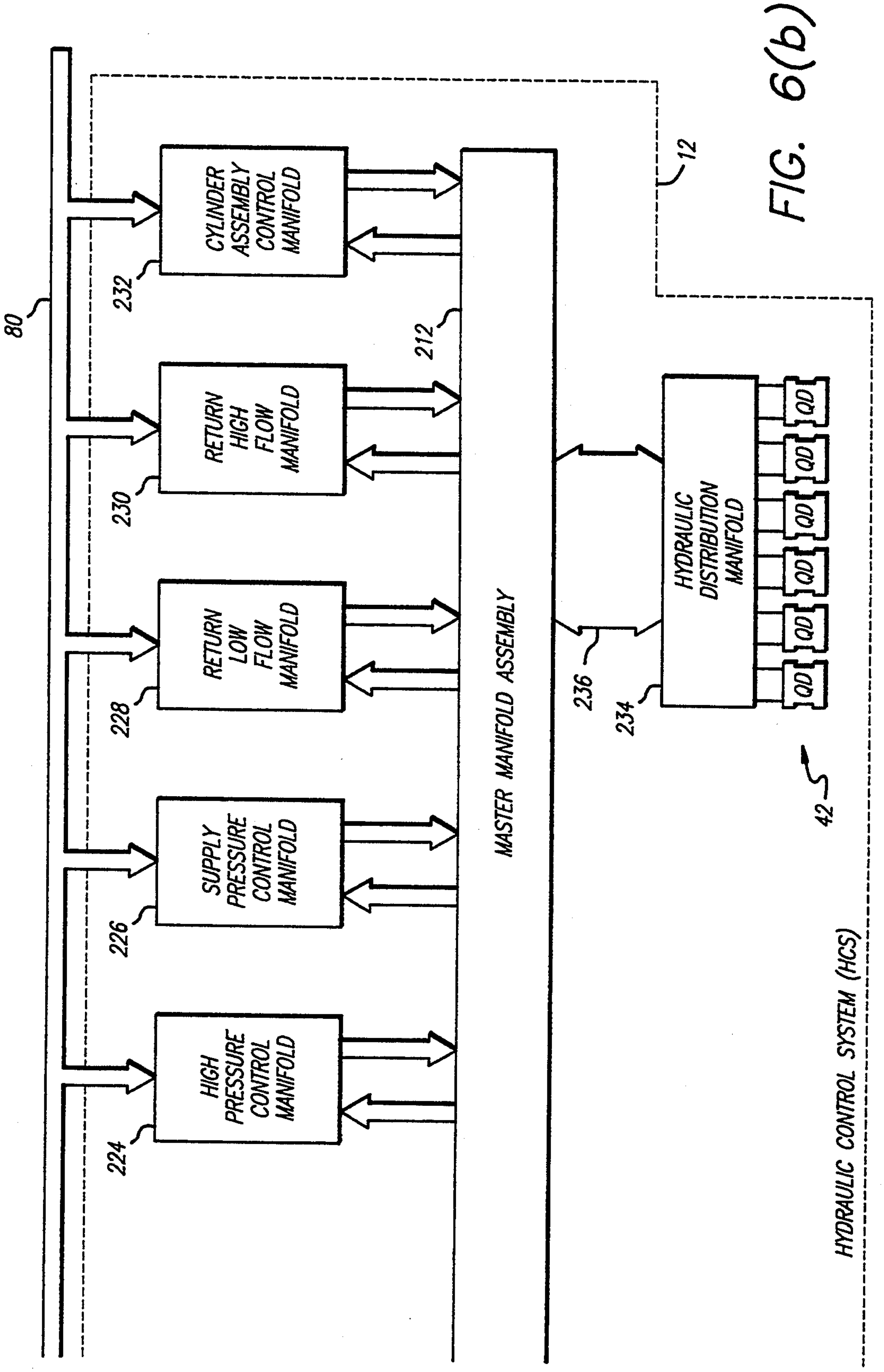

The hydraulic control system contained within the hydraulic console is shown in block diagram form in FIG. 6 to which reference is hereby made. Generally, the hydraulic supply system for utilization in the console and for connection to a UUT includes a source of hydraulic fluid under pressure which is supplied to a master manifold which through appropriate controls can be used to supply to output ports hydraulic fluid of the desired pressure and at a desired flow rate depending upon the particular UUT being tested. The system as shown in FIGS. 6(*a*) and (*b*) presumes a self-contained source of hydraulic fluid under pressure. It will be understood by those skilled in the art that the self-contained source may be eliminated and a source of fluid under pressure provided at the facility wherein the test equipment is housed, may be used. Under these circumstances, the facility hydraulic supply would be connected to the master manifold assembly and the return to the facility hydraulic supply would be connected from the master manifold assembly to the facility hydraulic supply return.

As is shown more in detail in FIG. 6, there is provided a reservoir 200 containing hydraulic fluid. Connected to the reservoir is a pump 202 which is driven by a motor 204 which has applied to it appropriate electrical energy from a source 206 through a motor controller 208. The pump 202 functions in a normal manner to draw fluid from the reservoir 200 and supply the same under pressure through an appropriate conduit 210 to a master manifold assembly 212. Fluid is returned to the reservoir through a return conduit 214. Also connected to the reservoir 200 is a high pressure pump 216 which is driven by a hydraulic motor 218 that is connected to the master manifold assembly. The function of the high pressure pump 216 is to provide hydraulic pressure to predetermined UUT's at a pressure higher than that normally available from the normal supply pump 202.

Through appropriate commands received from the computer system and applied to the ICI and from there through the appropriate connector panel 80 to the hydraulic control system, various of the sub-manifolds may be activated. Such activation causes the hydraulic fluid at the pressure and flow rate needed for a particular test to be applied through the master manifold assembly 212 to the ports 42. For example, the filtration manifold 220 would be activated so that the fluid provided from the pump 202 is appropriately filtered both at the supply and return to remove any unwanted contaminants from the fluid. The drive load manifold 222 would be activated and controlled in order to supply fluid under pressure through the appropriate port to drive or manipulate the UUT connected to that particular port. The high pressure control manifold 224 is utilized to control the application of high pressure fluid through the high pressure pump 216 to the master manifold assembly. The supply pressure control manifold 226 is utilized to control the application of fluid under pressure at the normal supply pressure to the master manifold assembly. The return for the low and high flow manifold assemblies 228 and 230, respectively, are utilized to control the return to the reservoir from either a low flow or high flow condition depending upon the UUT. The cylinder assembly control manifold 232 is utilized to apply the appropriate flow of fluid to the desired port which is connected to a cylinder UUT. As is noted, the output ports 42 are connected to a hydraulic distribution manifold 234 through appropriate conduits 236.

It will be understood by those skilled in the art that through the appropriate interconnections, both electrical and hydraulic, within the hydraulic control system and to the ICI and the computer control system that various of the control ports 42 can have applied to them a desired flow of hydraulic fluid at the desired pressure for application to a UUT which is to undergo tests. With such controls, the operator can connect the UUT to any of the ports desired and thereafter have the fluid applied to the UUT under control of the hydraulic control system without additional difficulty or interaction with the system.

For the automatic test equipment constructed in accordance with the principals of the present invention to properly operate, there is provided software. The software consists basically of four major parts; the system software, the UUT test software, the self-test and maintenance software, and calibration software. The system software provides an interface for all other high level software to access the automatic test equipment's electronic and hydraulic functional capabilities. The UUT test software includes the commands which control the automatic test equipment and the UUT through the test sequences as required by the UUT's specifications. The self-test and maintenance software provide a suite of automatic tests necessary to maintain or troubleshoot the automatic test equipment. The calibration software provides automated calibration procedures that calibrate the automatic test equipment's internal instruments with acceptable external standards.

Figure 7:
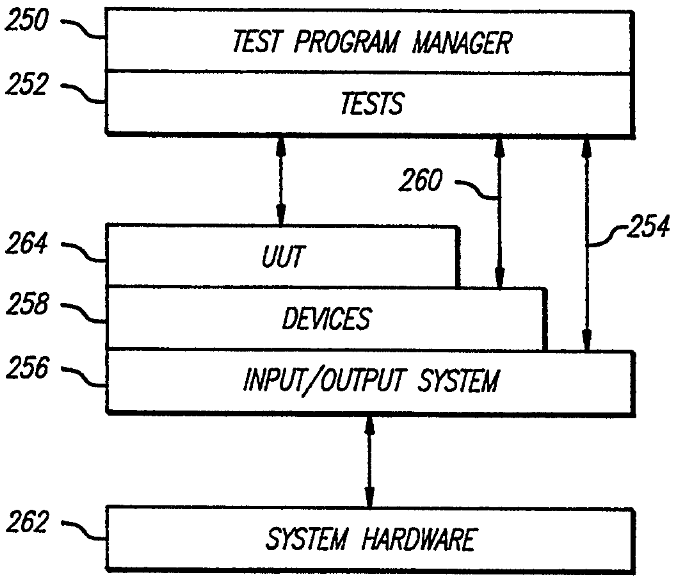
FIG. 7 is a generalized diagram showing the operational hierarchy of the software utilized in the present invention.

The system software may be visualized as a plurality of layers enabling communication between a test program manager and the system hardware in order to sequence through a series of test steps (a test program) necessary to test the functionality of a UUT. This is illustrated in FIG. 7 to which reference is hereby made. As is therein illustrated, a test program manager 250 controls a plurality of tests 252 by communication as illustrated by the communication path 254 between the tests 252 and the input/output system 256 as well as between the tests 252 and the devices 258 as shown by the path 260. The input/output system (or channels) 256 communicates with the system hardware 262 to in turn run the test through the UUT 264 and provide results back to the test program manager. As shown, there is two-way communication between the various portions of the system software.

Figure 8:
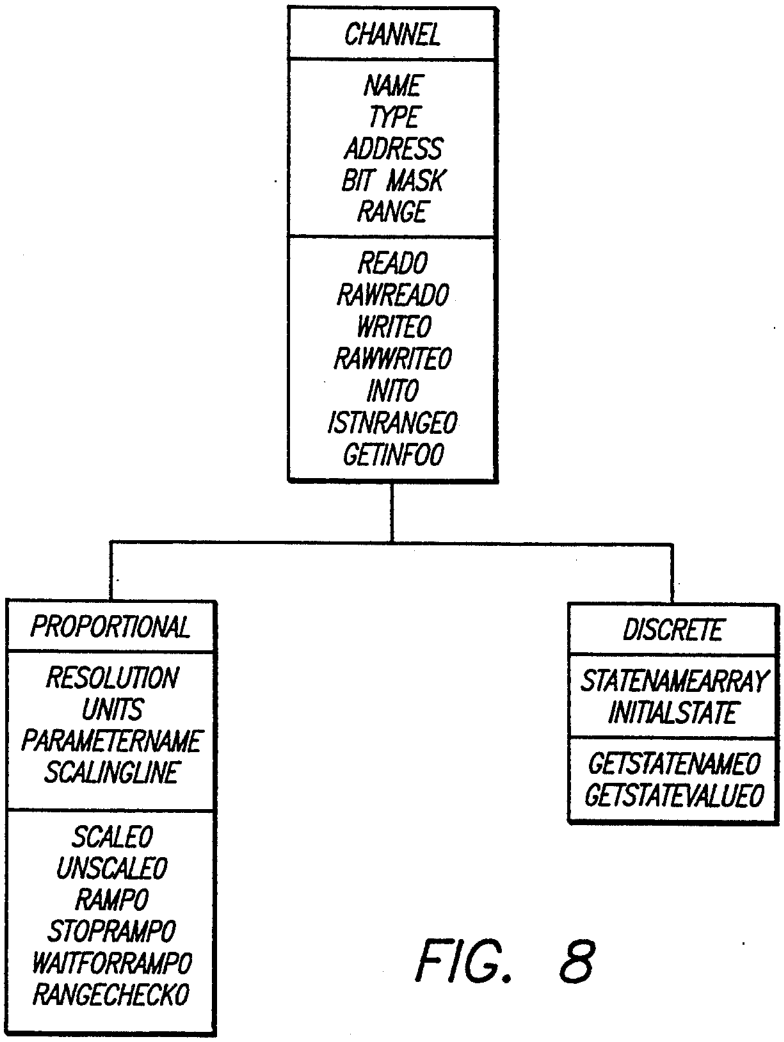
FIG. 8 is illustrative of the input/output channels as used in the system shown in FIG. 7.

More specifically, the input/output system (channels) as illustrated in FIG. 7 is shown in greater detail in FIG. 8. The input/output (I/O) channel, as indicated above, provides the communication objects that interface the upper layers of software to the system hardware. The I/O channel as shown in FIG. 8 is the principal class involved in this layer. FIG. 8 shown the inheritance structure of the I/O channel. Channels are either of the proportional or the discrete type depending upon the communication hardware. Proportional channels are used for parameters such as hydraulic flow, pressures and the like which vary proportionally throughout the range of the device. Discrete channels are used for state oriented controls such as controlling a solenoid valve to the open state or the closed state. The system software contains a plurality of such channel declarations which define the hardware/software interface. In addition, the I/O system includes other classes which operate on channels to generate dynamic commands, record test system parameters against time and detect test system events, respectively.

For any particular channel, the information which is common is the name of the channel, the type of channel, the address of the channel, the range between high and low of the characteristics of the channel and the built in test (BIT) mask, i.e. where, in the word being received, will the desired information reside. The capabilities for the particular channel class insofar as functionality is concerned, is to read, raw read (read unscaled data), write, raw write (write unscaled data), initialize (check the data read falls within the specified range) and to get information. The characteristics and the functionality for the channel class would be common to all of the channels in the automatic test equipment. A subclass of the base or abstract class, channel, is the proportional channel class. The proportional channel class inherits all of the characteristics and the functionality from the channel abstract class and, in addition thereto, also includes the additional characteristics of resolution, the particular units in which measurement controls communicate in the parameter name and the scaling line. The functionality of the proportional channel includes scaling, unscaling, ramping (which means to cause the particular characteristic being controlled to increase or decrease at some specified rate), to stop ramping, to wait for the ramp and to check the range. It may thus be seen that when a proportional I/O channel is defined and a specific instance thereof is declared (named), the characteristics for that instance are defined utilizing the information and functionality inherited from the abstract channel class as well as the more specific information from the proportional class.

The discrete channel class is an additional subclass in an I/O channel. These devices are those which have a particular state such as on/off devices, for example solenoids, or the like. The discrete channel class provides a means to read from and write to an automatic test equipment communications port for such a discreet on/off data device. When the discrete channel class is declared, it, like the proportional channel class, inherits from the abstract channel class as above identified, both as to characteristics and functionality. In addition thereto, the characteristics include, for the discrete channel class, state name array (which associates a name with each possible value), initial state, and the functions, to get the state name and get the state value.

As specific examples of some of the channels which may be available in any particular automatic test equipment, the following is provided.

CHANNEL 1—Facility Pressure Select—3,000 psi
CHANNEL 2—Facility Pressure Select—4,500 psi
CHANNEL 3/4—Leakage Flowmeter Select
CHANNEL 5—RI Leakage Meter Select
CHANNEL 6—RII Leakage Meter Select
CHANNEL 9/10—SVD OUT O/OUT 1
CHANNEL 11—Supply Filter
CHANNEL 12—Return Filter
CHANNEL 13—High Pressure Supply Filter
CHANNEL 14—Return Shutoff Valve
CHANNEL 15—Rotary Coupler Engaged
CHANNEL 16—Rotary Coupler Disengaged
CHANNEL 17—ECC Interlock Switch
CHANNEL 18—Test Bed Safety Doors
CHANNEL 19—Linear Encoder Conditioner Alarm Indicator CHANNELS 1-6 are each discrete read/write solenoids which are visible to the operator, while CHANNELS 9-19 are discrete devices which are read only and are visible to the operator. As can be seen, each of the devices has a state of being on or off and thus is discrete.

Typical examples of proportional channels are provided as follows.

CHANNEL 1—Linear Actuator Fixture Encoder
CHANNEL 2—Manual Input Arm Fixture Encoder For Linear UUT's
CHANNEL 3—Rotary Fixture Encoder
CHANNEL 4—Drive/Load Actuator Control
CHANNEL 5—Drive/Load Actuator Control With Rotary Actuator Positioned Feedback
CHANNEL 6—Feedback Offset With Range Gain Of 0.25
CHANNEL 7—Rotary UUT Manual Input Arm Actuator With Feedback Proportional
CHANNEL 8—Large Flowmeter
CHANNEL 9—Leakage Flowmeter
CHANNEL 10—Load Fixture Torque Transducer
CHANNEL 11—Linear Load Actuator Load Cell
CHANNEL 12—Manual Input Arm Load Cell For Linear UUT
CHANNEL 13—Manual Input Arm Load For Rotary UUT
CHANNEL 15—System Supply Fluid Temperature
CHANNEL 16—Hydraulic Console Cabinet Air Temperature
CHANNEL 17—RI Port Fluid Temperature
CHANNEL 18—RII Port Fluid Temperature As can be seen, each of these proportional channel devices are proportional, insofar as their characteristics are concerned, Channels 1 through 7 are read/write while channels 8 through 18 are read only and are visible to the operator. Those skilled in the art will readily recognize that many additional I/O channels can be utilized depending upon the particular test equipment and the UUT's to be tested.

By reference now to FIG. 9, there is illustrated schematically, in block diagram form, the hierarchy of classes as applied to servocontrol devices. The device 280 is an abstract class containing characteristics for all servodevices which characteristics are inherited into the lower classes of such devices as will be more fully explained hereinafter. The characteristics for the devices falling within the device abstract class would be such characteristics as get Device, get the Device list, stop all Devices, register Device clean up, and stop. For each servocontrol 282 subclass, such characteristics as the electrical signal wave type (sinusoidal, sawtooth or the like), the duration of the wave, the maximum number of cycles, the amplitude, offset, frequency resolution and ramp rate may be utilized. In addition thereto, commands are provided from the test program manager, as will be described more fully hereinafter, to write, to read and to ramp insofar as the servocontrol device is concerned.

As can be seen, there are specific servocontrols such as the flow servocontrol 284, the direct drive servocontrol 286 and the UUT servocontrol 288 which function as additional subclasses of the servocontrol. Under the flow servocontrol, there are specific devices identified as the linear actuator 290 and the rotary actuator 292. The flow servocontrol and the two instances of linear actuator and rotary actuator are utilized as part of the automatic test equipment system. It will thus be recognized by those skilled in the art that the particular tests which are conducted utilizing the automatic test equipment in accordance with the present invention, are applicable to those devices which exist within the automatic test equipment as well as to the devices which are units under test such as the UUT servocontrol 288.

When a UUT servocontrol 288 is declared, the characteristics which exist with respect thereto are set the current gain, set the frequency component, enable the digital to analog converter (DAC) get the feedback type, determine whether the servo is on, get the total current and either open or close feedback loops as may be required.

As will be noted, under the UUT servocontrol 288 there are two additional subclasses, the LVDT feedback servocontrol 294 and the encoder feedback servocontrol 296. The encoder feedback servocontrol would be a type of a specific servocylinder in which the characteristics would be to initialize the feedback by setting the position feedback offset and to then set the gain and range of the feedback stages. When the specific instance of the encoder feedback servocontrol 296 is declared, inheritance would occur from the characteristics for the UUT servocontrol 288, the servocontrol 282 and the device 280 all of which would be included with the encoder feedback servocontrol 296 to provide the necessary information needed to conduct a test. On the other hand, if an LVDT feedback servocontrol 294 is declared, then the characteristics which would be utilized with respect thereto is the current gain, the frequency component and the cutoff frequency. Again the characteristics from the device 280, servocontrol 282 and UUT servocontrol 288 would be inherited into the LVDT feedback servocontrol 294 for conducting the appropriate tests. In the event that a particular servocontrol device included multiple LVDT's, then that instance, as shown at 298, would be declared and the multiple LVDT paths would be enabled and the appropriate frequency components and read/write commands would be provided. In this manner, all of the previous characteristics from the device 280, servocontrol 282, UUT servocontrol 288 and LVDT feedback servocontrol 294 would be inherited and included into the specific instance of the multi LVDT feedback servocontrol 298 to provide the control for such a device.

It will be recognized by those skilled in the art that similar characteristics would be developed for each of the additional subclasses such as the flow servocontrol 284 and direct drive servocontrol 286 as well as the specific instances of the linear 290 and rotary 292 actuators in order to provide the required tests for such devices.

Figure 10:
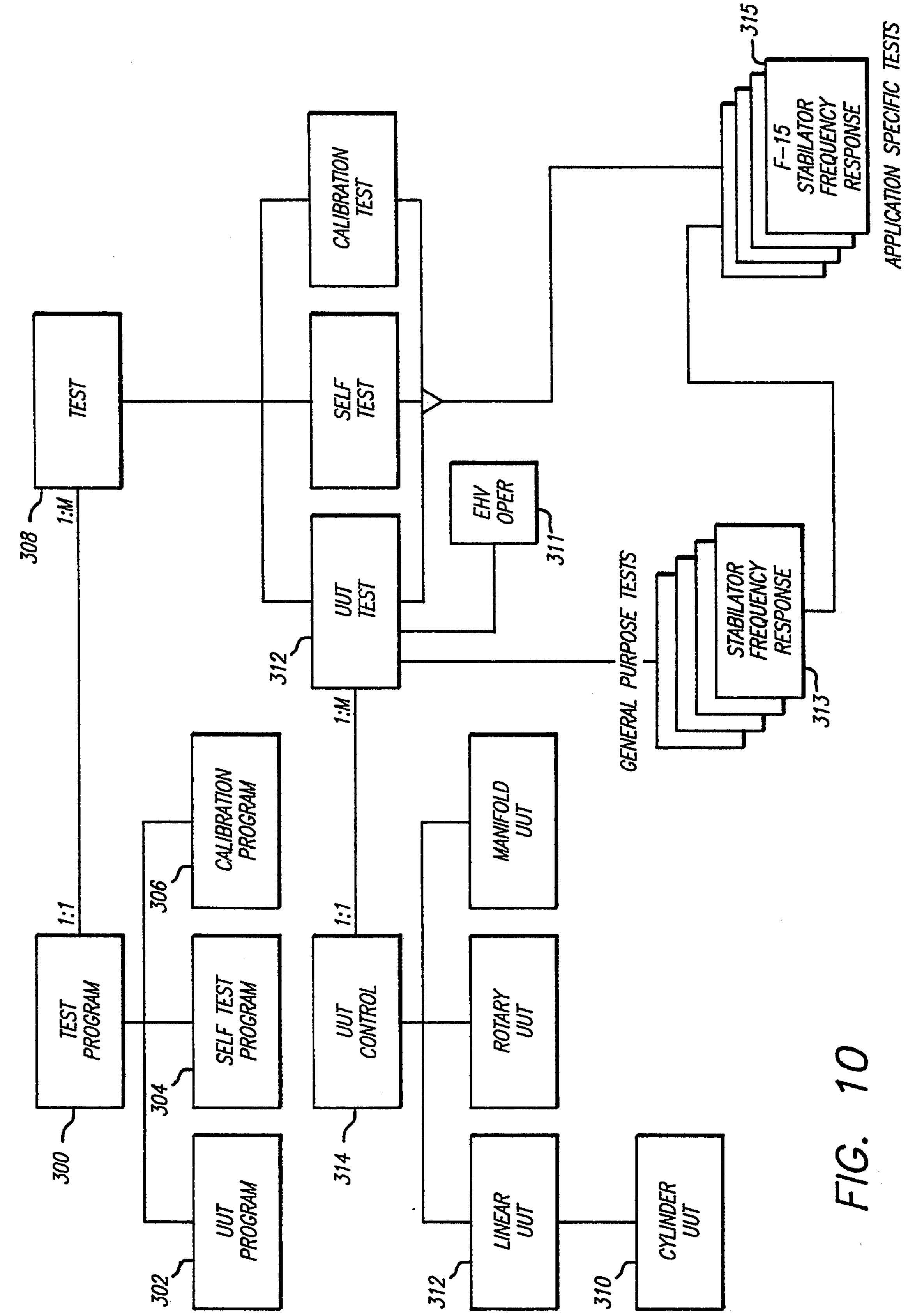
FIG. 10 is a diagram showing the test program manager.

The test program manager as shown in FIG. 7 is set forth in more detail schematically and in block diagram form in FIG. 10 to which reference is hereby made. The test program 300 contains components, test groups and tests and provides functions to add items to the test program, show the items which belong to the test program, run all of the tests or individual tests as may be desired, to perform fault isolation, generate test status reports and detailed test results reports, generate a fault isolation report, indicate whether it is valid to resume a test sequence and to provide additional miscellaneous functions to support these various tasks. The most important purpose of the test program is to provide a framework for running a sequence of tests. A particular test to be administered by the test program 300 can be determined as the UUT program 302, the self-test program 304 or the calibration program 306. The test 308 sequences the test from the test program to the particular instance which has been declared, receives and stores the data generated during the test and conducts the diagnostics test when such is to be done as a result of a failure of the device being tested whether it be a UUT or a part of the automatic test equipment.

A UUT test is defined when a specific instance of a specific type of UUT test has been declared. When such occurs, a specific instance of a UUT, for example an instance of a cylinder UUT 310, is specified to the UUT test. The UUT test can thereby utilize the services provided by the specified UUT object to perform the required testing procedure. The UUT object, for example an instance of a cylinder UUT 310, inherits the characteristics for the linear UUT 312 and UUT 314. The UUT test class adds an instance relationship which identifies what UUT a test object is testing. The UUT class provides functions that can be used by the UUT test objects to control the UUT. For example, the UUT class provides the ability to statically and dynamically command the UUT, control its solenoid valves, and provide functions for applying standard operating pressures, coupling or uncoupling the UUT from an external load, mounting a UUT into its fixture, and purging the air from a UUT, to name a few. In addition, the UUT objects defines how a specific UUT is connected to the automatic test equipment system. As a result, UUT tests can be designed to operate on various UUTs that are each connected to the automatic test equipment differently. For example, an LVDT test can be written to query the UUT object to determine how many LVDT channels it has and what automatic test equipment devices they are connected to. With this information, the same test class can be used for various types of UUTs that have one or many LVDTs.

The test base class 308 includes characteristics applicable to all test subclasses which includes data comparison operations, test result report generation, start time logging, temporary information and results storage, and the like. The functions would be such things as get the results, isolate, report the isolation information, report test details, run the tests, set the test status and the like. The UUT test 312 is an abstract class which defines characteristics which are used by each of the specific instances of UUT tests to be performed.

In some cases, there are test classes which provide functionality specific to a particular testing procedure which are designed to be inherited by more specific test classes and applied as appropriate to a plurality of UUTs. These tests may be referred to as general purpose tests and are shown, for example, as frequency response 313. More specific tests are then defined, for example, F-15 stabilator frequency response 315 which inherits the services provided by the general purpose test and applied as appropriate to specific UUT testing applications. This is illustrative of the fact that tests may be designed to be performed with regard to a plurality of different instances of specific devices without a change in the test, that is the specific test such as EH-VOPER 311 or stabilator frequency response 313 does not "know" what UUT it is being run on. In this manner, it can be seen that a specific detailed test procedure does not need to be designed for each and every instance of specific device be it UUT or self-test that is to be tested.

The self-test and calibration test are the sequence of tests which are conducted directed to the automatic test equipment devices when the self-test program or the calibration program has been selected either automatically or by the operator.

Figure 11:
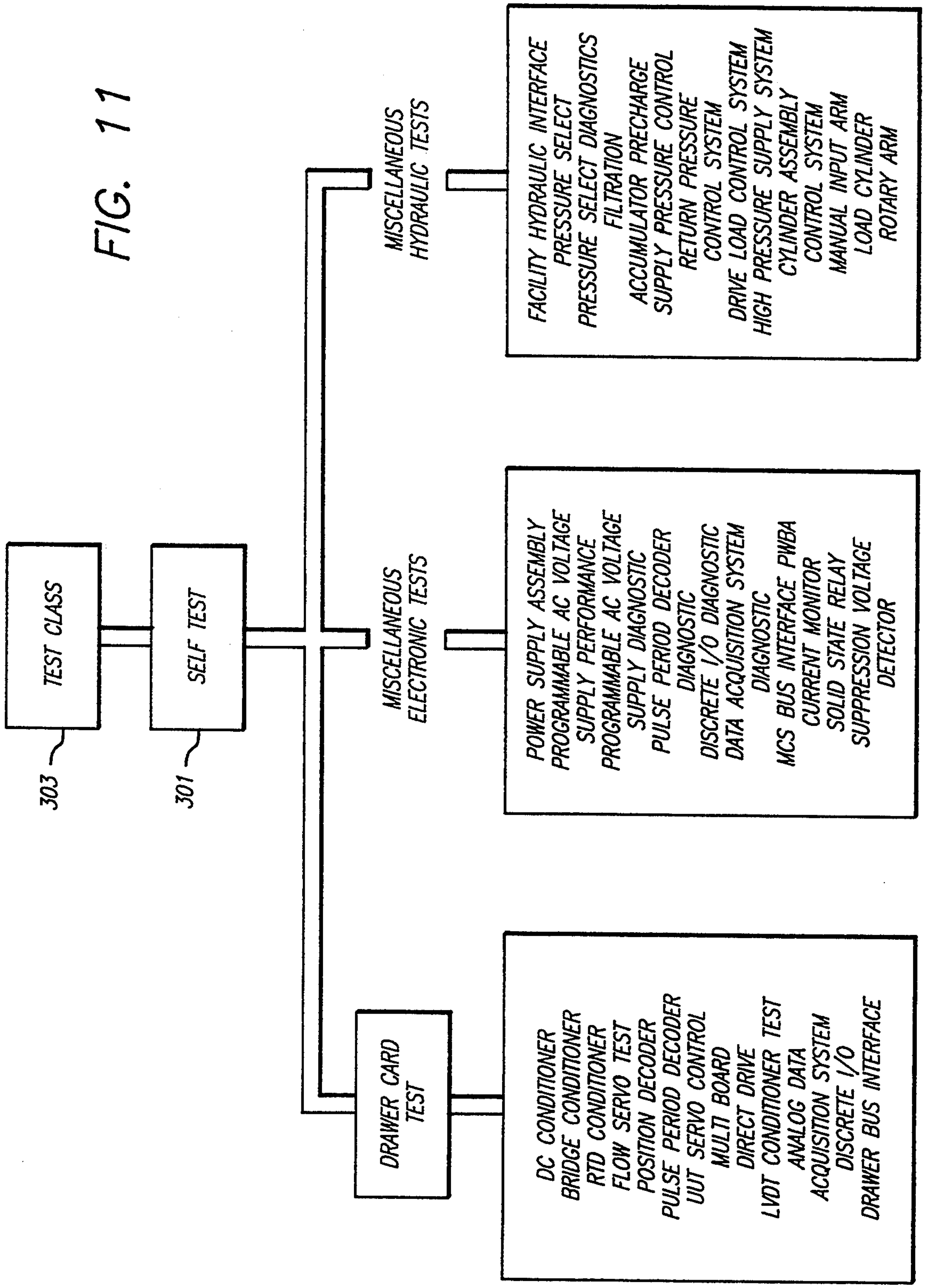
FIG. 11 is a chart illustrative of the self-test classes used to test the automatic test equipment.

The self-test software is illustrated more specifically in FIG. 11 to which reference is hereby made. The self-test software contains a set of classes that model the types of tests required to adequately verify that the automatic test equipment is fully operational. Self-tests are developed by inheriting from the self-test base class 301 which in turn inherits from the test class 303. As is clearly shown in FIG. 11, the self-test includes a drawer card test, miscellaneous electronic tests and miscellaneous hydraulic tests applicable to the entire automatic test equipment. Set forth in each of the types of tests to be conducted is at least one instance of every class listed. Some classes have more than one instance such as the direct current conditioner test (DC Conditioner). As an example, the D.C. conditioner test tests the direct current conditioner cards in the automatic test equipment system. Since there are four of these cards contained in the drawers in the automatic test equipment, there are four individual D.C. conditioner test objects one for each of the cards. The test objects require parameters which characterize the test to be specified when the specific test is declared. In the case of the four D.C. conditioner test objects, the only difference between the four instances is the different I/O channels which are specified. Should the system be reconfigured to use more or less cards, or should the I/O channel assignments change, such can be accommodated by changing the parameters that define the D.C. conditioner test objects or by adding or deleting test instances.

Figure 14:
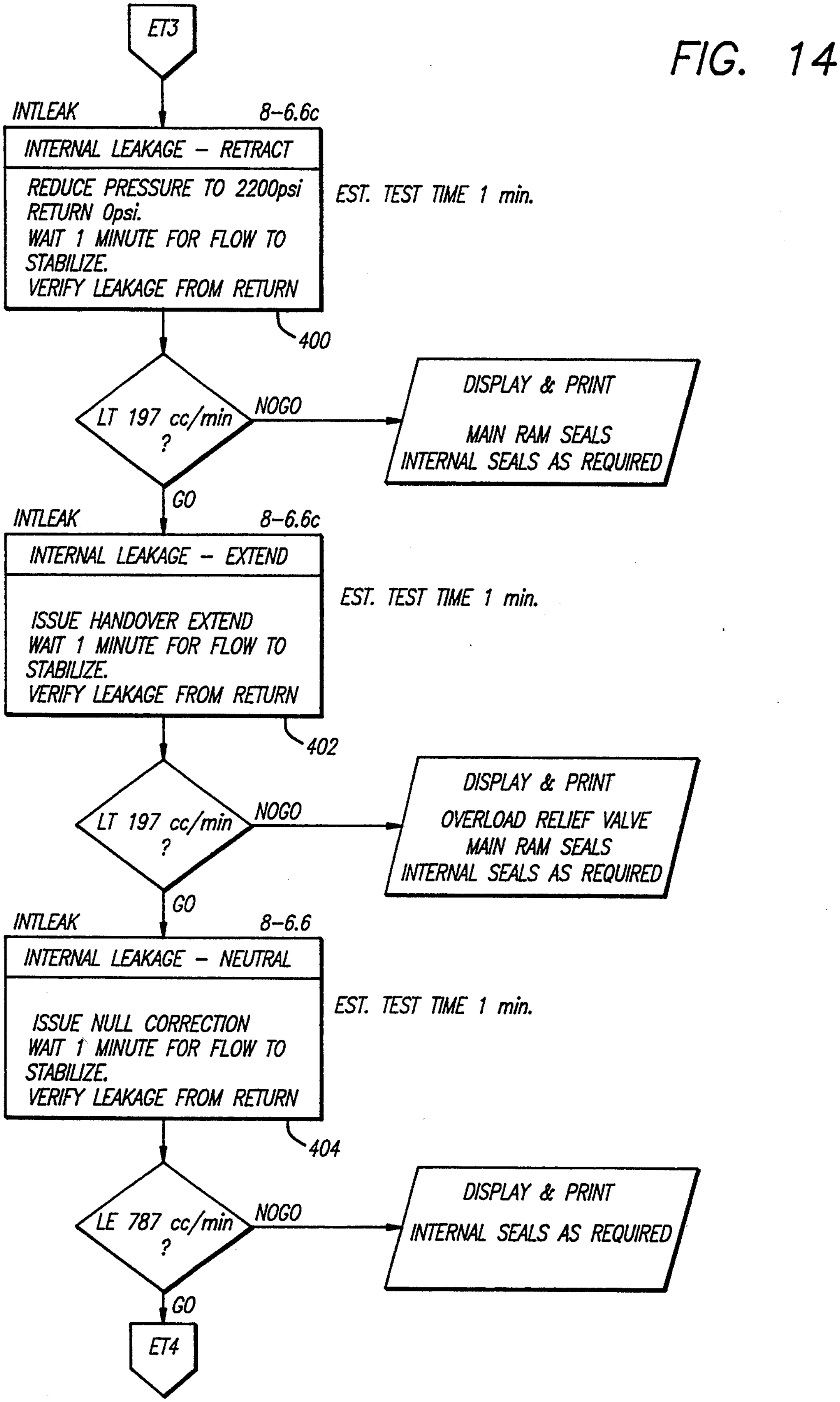
FIG. 14 is a flow chart showing an internal leakage test on an aileron actuator.

Referring now more specifically to FIGS. 14–17, there are shown a series of flow charts which are representative of the performance of tests utilizing the system and automatic test equipment of the present invention. These flow charts are merely representative of the diagnostic capability of the test program and test classes of the system. As is shown in FIG. 14, an internal leakage test is being conducted on a servoactuator which, for example, may be used as part of an aileron package on an aircraft. As is indicated at 400, the actuator has applied thereto a signal which causes the actuator to retract and the pressure to the actuator is reduced to 2,200 psi with the return being at zero psi. Flow is caused to stabilize and the leakage is then measured. If the leakage is greater than 197 cubic centimeters per minute, the actuator has failed and a display and print will occur indicating that the main ram seals or the internal seals require replacement. If, however, the leakage is less than (LT) 197 cubic centimeters per minute in the retracted position, a command is given to the servoactuator to full extend after which the flow is stabilized and the leakage is again measured. Again, the leakage cannot exceed 197 cubic centimeters per minute, and if such does occur, then a no-go will be issued and there will be displayed and printed an indication that the fault lies in the overload relief valve, the main ram seals or the internal seals of the unit. If, however, the leakage is less than (LT) 197 cubic centimeters per minute, then a command is given to the actuator to return to its null or neutral position. Thereafter, the flow is allowed to stabilize and the leakage is measured. The leakage at this point should be less than or equal to (LE) 787 cubic centimeters per minute. If the internal leakage is greater than 787 cubic centimeters, then there will be a no-go and the display and print will indicate that the internal seals need to be replaced in order to put the actuator into an operable condition. If, however, the leakage is less than or equal to 787 cubic centimeters per minute, a go is indicated and the test program 300 automatically will sequence to the next test.

Figure 15:
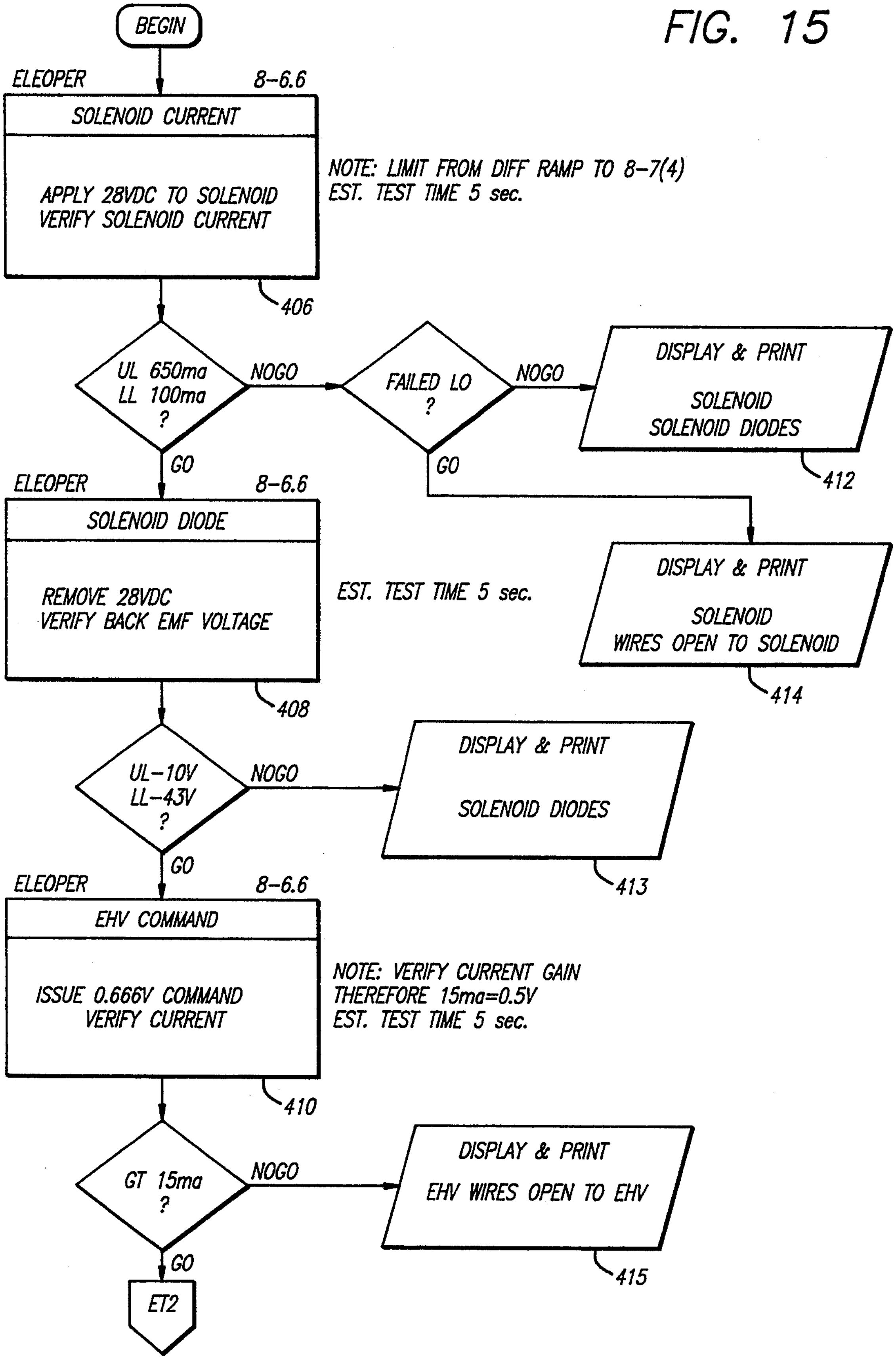
FIG. 15 is a flow chart showing a bypass door test illustrating different call outs when a failure is above or below specification limits.

FIG. 15 is a flow chart illustrative of an additional test subject directed to, for example, an elevator operator on a bypass door on an aircraft. As is shown at 406, 28 volts d.c. is applied to a solenoid and the solenoid current is then measured to determine if it is within limits. The upper limit (UL) is 650 milliamperes and the lower limit (LL) is 100 milliamperes. If the current falls within these limits, then the test sequences to the solenoid diode at 408. At this step in the test sequence the 28 volts d.c. is removed from the diode and the back EMF voltage is measured. The upper limit (UL) is minus 10 volts, the lower limit is −43 volts. If the measurement verifies that the back EMF voltage is within these limits, the sequence moves to the electrohydraulic valve command at 410. At this position in the test sequence a command signal of 0.666 volts is applied and the current is then measured. The current should be greater than (GT) at 15 milliamperes. If such is the case, then the test is satisfactory and complete and the test program manager sequences to the next test.

The flow chart as illustrated in FIG. 14 is also illustrative of the ability of the present system to isolate a fault which has been detected during the sequencing of the test program. When a test is being conducted, the test is sequenced through each step under control of the test program 300 and test 308 as above described. When the test has been completed, then the test program returns and ascertains whether any of the limits have been exceeded, that is, asks the question of whether the failure has occurred. If a failure has occurred, the test program then sequences to that position in the test and defines in greater detail the failure and provides a diagnosis as to the probable cause of the failure. For example, if a failure has occurred in the solenoid current, at 406 there will be a no-go to determine whether the failure was low or high. If the failure was low, then a no-go will exist showing that the solenoid or solenoid diodes are defective as shown at 412. If the failure was high, then it indicates that the solenoid and wires which open to the solenoid exist and such would be displayed as is illustrated at 414. On the other hand, if the solenoid diode failed and was outside the upper and lower limits, there would be a no-go and it would be displayed and printed that the solenoid diodes had failed as shown at 413. If, however, the electrohydraulic valve command current was not as required, then there would be displayed and printed that the wires were open to the EHV as shown at 415.

Figure 13:
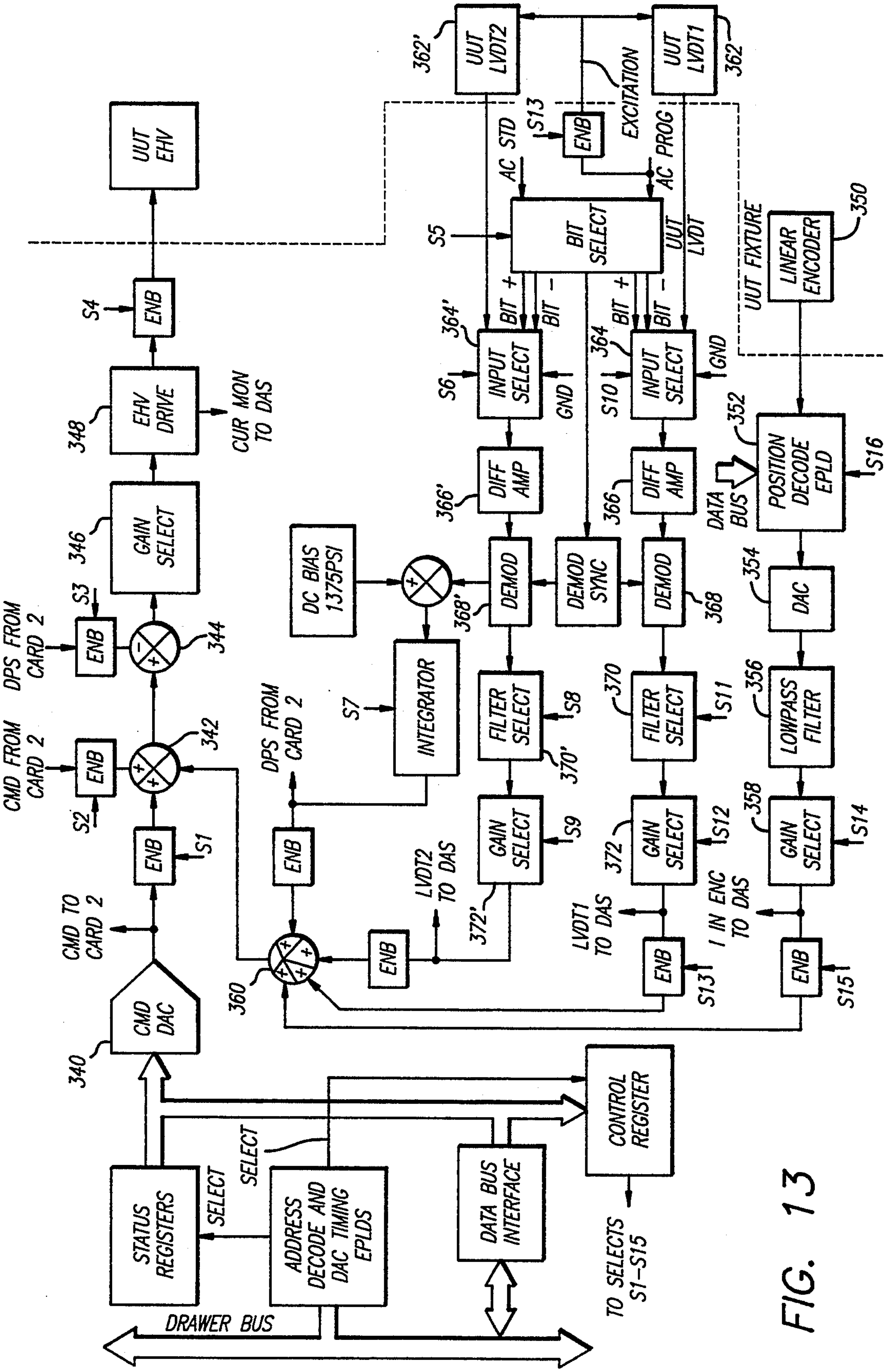
FIG. 13 is a block diagram illustrative of the unit under test servocontrol circuit used therein.
Figure 16:
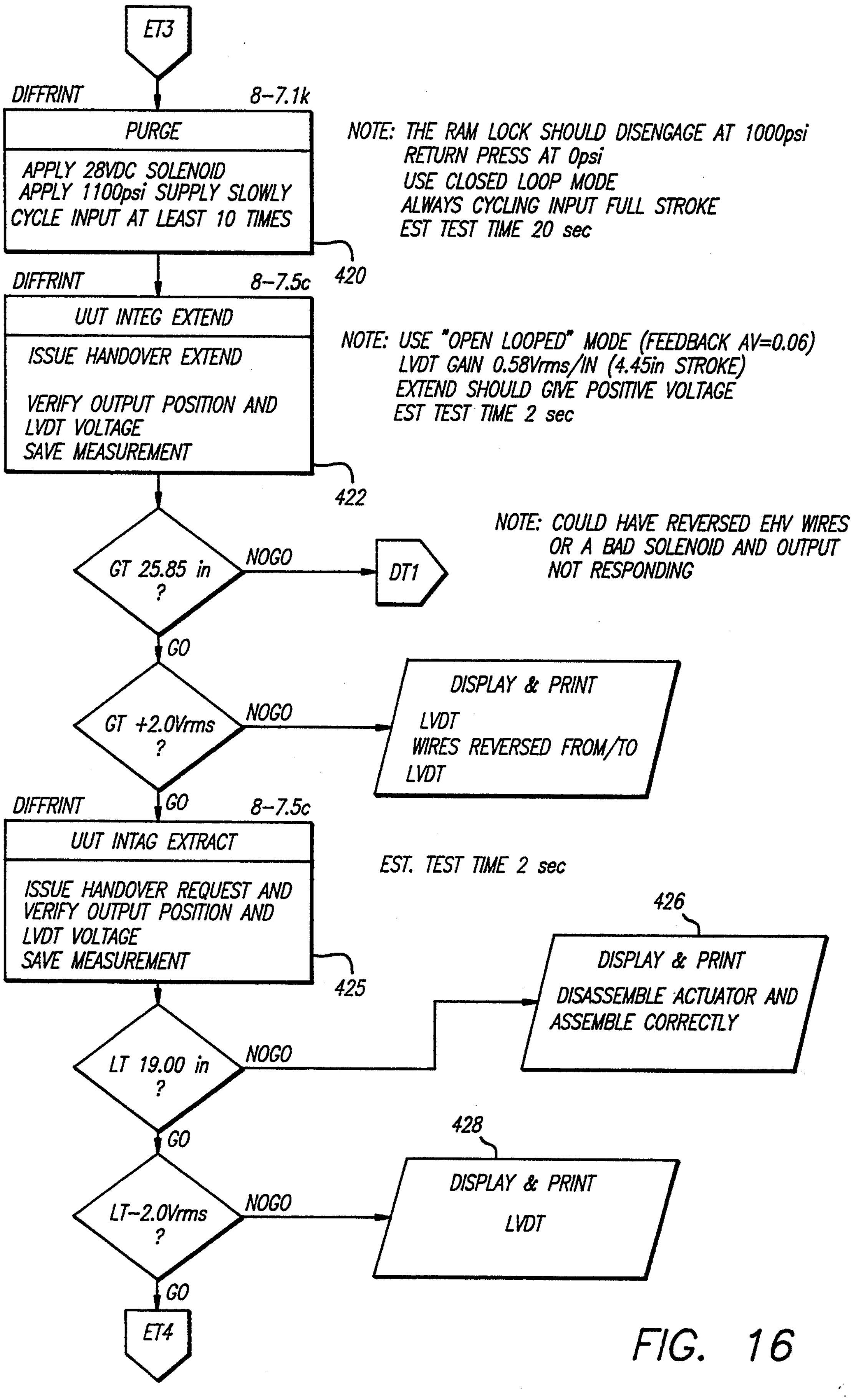
FIG. 16 is a flow chart showing a differential integrity test illustrating a branch to a diagnostic test on a failure.

As is illustrated in FIG. 16, a test on a UUT including an LVDT is being conducted and as shown the first step in the sequence is a purge at 420 which is accomplished by applying 1,100 psi supply slowly and cycling the input at least ten times. Thereafter, as shown at 422, the command to extend in a hard over condition is applied with the feedback loop open. That is, none of the feedback circuits as shown in FIG. 13 for the UUT servocontrol block diagram are enabled (ENB). Thereafter, the output position and the LVDT voltage are measured and the measurements are saved. If the output position of the actuator is greater than (GT) 25.85 inches, the position is appropriate as well as the LVDT voltage being greater than (GT) 2 volts rms. If either of these do not meet the requirements, then a no-go is issued. If, for example, the position of the ram is not as required, then there would be an automatic branching to the diagnostic test DT1 as shown in FIG. 17.

As is shown at 424, the phase of the applied signal to which reference is hereby made is reversed and the output extended and measured to determine whether it is greater than (GT) 25.85 inches. If such occurs, then there would be a display and print showing that the wires are reversed to the EHV. If, however, it does not meet this standard, then there would be displayed and printed that the solenoid, the electrohydraulic valve and the main ram lock are improperly assembled and that the UUT is thus inoperative.

If, however, the output position and the LVDT voltage is appropriate, as shown in the flow chart of FIG.

15, then a signal is applied to cause the actuator to retract at which time the position is measured along with the LVDT voltage. If the position is less than (LT) 19 inches and the LVDT voltage is less than (LT) 20 volts rms, then the actuator is within specifications and the test program manager would automatically step to the next test. If, however, either of these tests show that the position is improper or that the voltage is improper, a no-go would be issued and there would be displayed and printed to either disassemble the actuator and assemble it correctly as shown at 426 or that the LVDT is inoperative as shown at 428.

Figure 12:
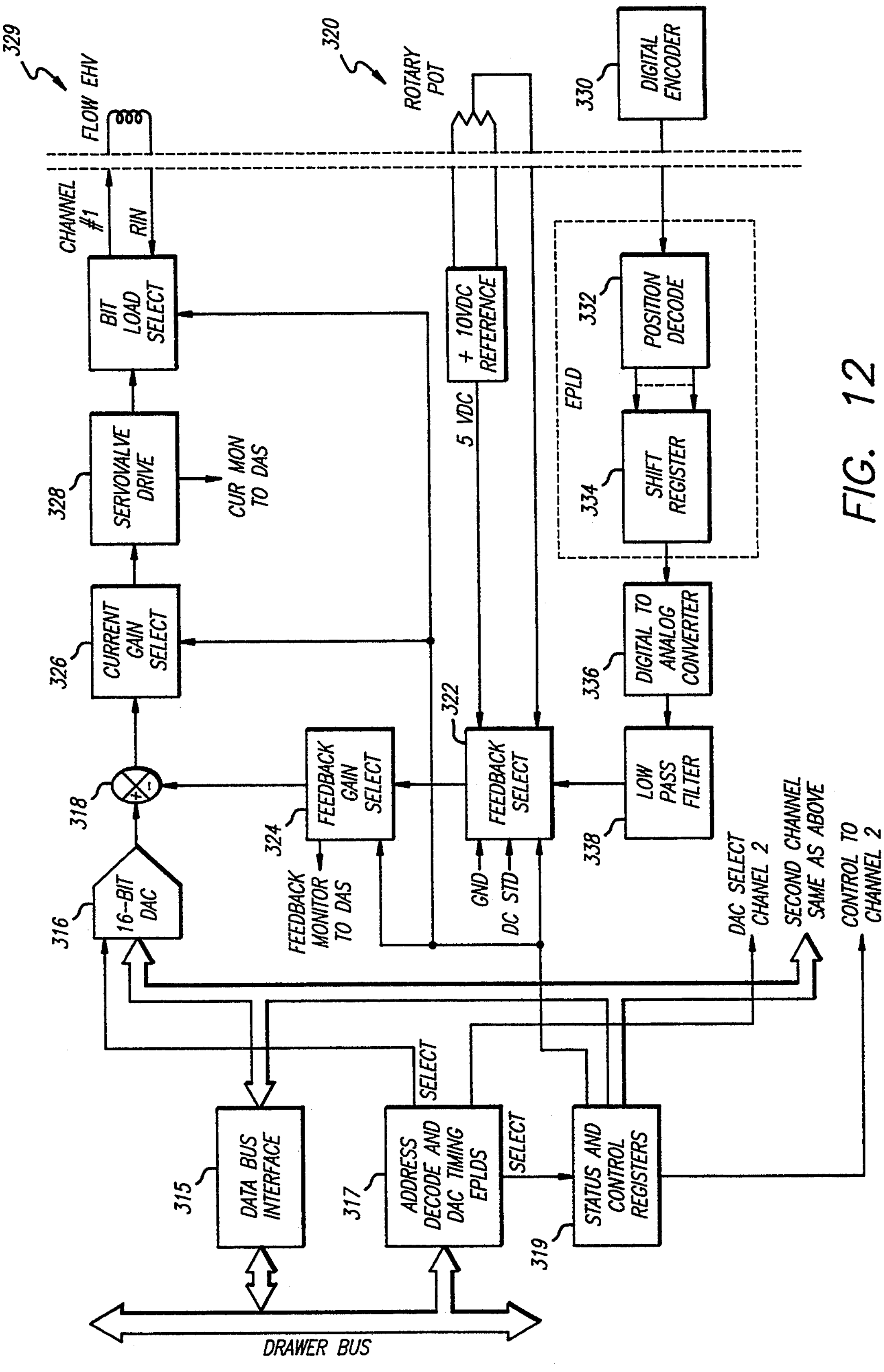
FIG. 12 is a block diagram illustrative of closed loop positional control circuits utilized by the test system to provide mechanical stimulus to the device to be tested and thereby to simulate pilot input.

Referring now to FIG. 12, there is illustrated a schematic diagram in block form for a flow servocontrol. The circuit as illustrated in FIG. 12 is the circuit which is controlled for the flow servocontrol 284 as shown in FIG. 9 responding to a test as described in conjunction with FIG. 10. As is illustrated in FIG. 12, commands are provided from the appropriate test program through the data bus interface 315 to a digital to analog converter 316 and then to a summing junction 318. Appropriate coding, control address information and DAC timing functions are provided by the erasable programmable logic devices (EPLD) 317 and registers 319 as is well known to those skilled in the art. Feedback is provided from the rotary potentiometer 320 through an appropriate feedback select 322 and feedback gain select 324 and also to the summing junction 318. The current gain select determines the appropriate gain for the specific device. The output is then applied to the servovalve drive 328 which in turn provides the appropriate signal to drive the servovalve 329 in accordance with the test sequence. The particular structure, as just described, would be used in the event that a rotary actuator 292 (FIG. 9) has been declared as the specific instance. In the event a linear actuator is to be utilized, then the feedback from the digital encoder 330 would be utilized and passed through the appropriate decoder 332, shift register 334, digital to analog converter 336 and filter 338 to the feedback select 322 and then as above described. The particular information which has developed as a result of the test would be applied back through the busses to the data acquisition system (DAS) for appropriate comparisons and storage. As is shown, a second channel may be provided.

By reference now to FIG. 13, there is shown a block diagram for a UUT servocontrol test circuit. Although there are three specific instances of UUT servocontrols, namely the LVDT 294, the multi LVDT 298 and the encoder feedback 296 as shown in FIG. 9, it will be recognized by those skilled in the art that the command digital to analog (DAC) converter 340, the summing junctions 342 and 344, the gain select 346 and the electrohydraulic valve (EHV) drive 348 are all common to anyone of the specific instances to be declared. In the event that a linear device, not utilizing an LVDT, such as the encoder feedback servocontrol 296, is declared, then the linear encoder 350, the position decoder 352, the digital to analog (DAC) converter 354, the appropriate filter 356 and the gain select 358 are enabled (ENB) by an appropriate command to apply a feedback signal to the summing junction 360 for application to the summing junction 342 and subsequently to the electrohydraulic valve drive 348. The additional feedback circuits utilizing LVDTS would not be activated but only the linear feedback circuit.

It will, of course, be understood by those skilled in the art that similar to the circuit as shown in FIG. 12, appropriate control command and timing signals are provided over the various busses as illustrated to the command digital to analog converter 340 to sequence through the series of steps required to test the UUT servo.

In the event a single LVDT is to be utilized, then the linear encoder section will be disabled and the LVDT feedback for UUT, LVDT 1 is enabled (ENB). Appropriate exitation is applied to the LVDT 1 362 which would in turn provide a signal to the input select 364, the differential amplifier 366, the demodulator 368, the appropriate filter 370, the gain select 372 and then to the summing junction 360 and ultimately to the electrohydraulic valve drive 348 as above described. Under these circumstances, the other feedback path for the UUT, LVDT 2 would not be enabled. If, however, a specific instance of a multi LVDT feedback servocontrol 298 is declared, then the UUT LVDT 2 feedback circuit is enabled along with the UUT LVDT 1 feedback circuit. The UUT LVDT 2 feedback circuit utilizes the same reference numerals as the UUT LVDT 1 except they are primed.

It can thus be seen that for the UUT servocontrol, various portions of the circuit are activated or deactivated depending upon the specific instance of servocontrol device which is being declared for the particular test involved. During the sequencing of the test as applied to the specific device, appropriate information concerning the specific device is applied to the data acquisition system (DAS) for comparison with the characteristics applicable to that device, be they specific or inherited from a higher class, to determine the functionality of the specific device being tested.

Similar types of circuits would be utilized for the direct drive servocontrol as will be readily recognized by those skilled in the art.

Figure 18:
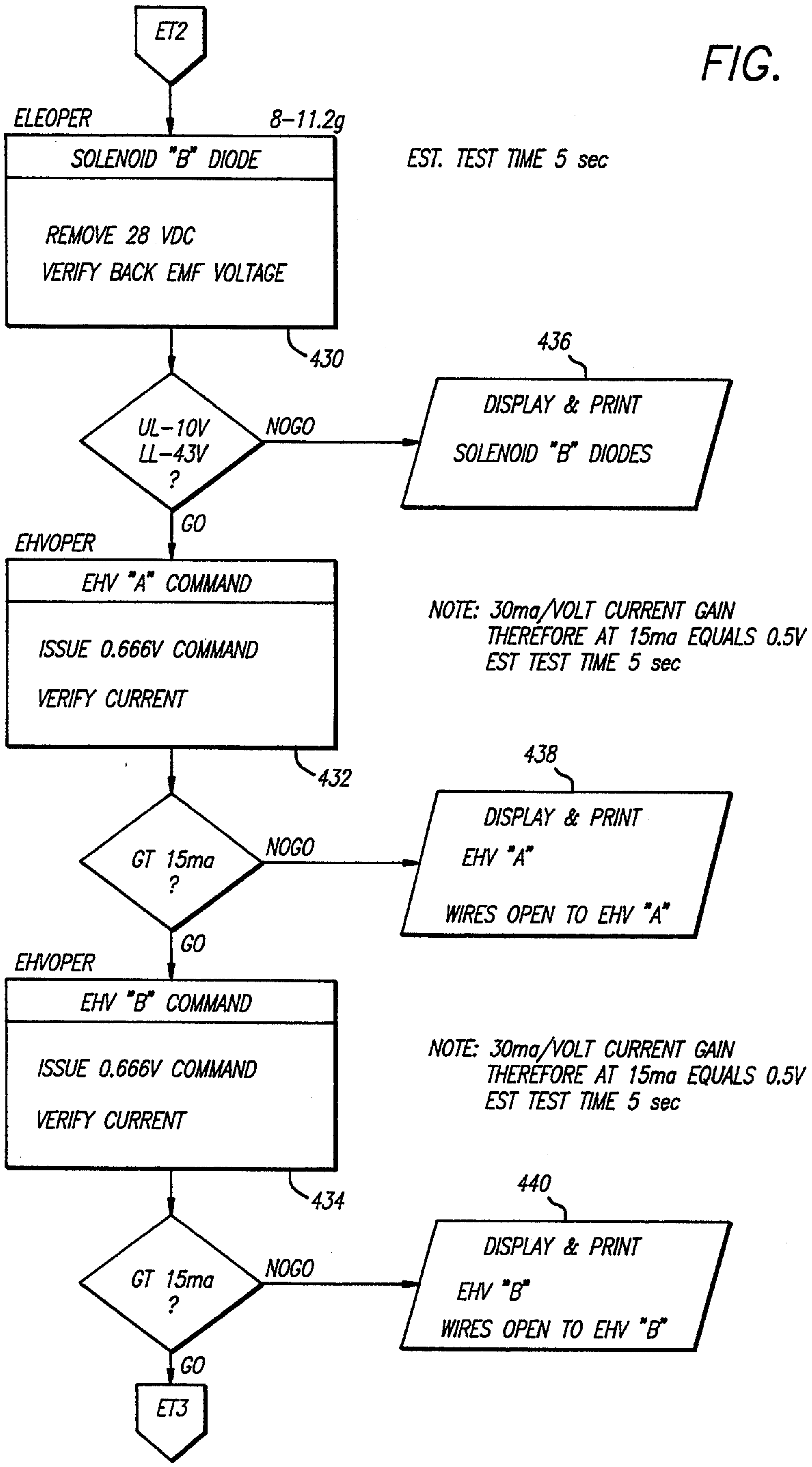
FIGS. 18 and 19 are flow charts showing use of one specific test on two different types of devices under test.
Figure 19:
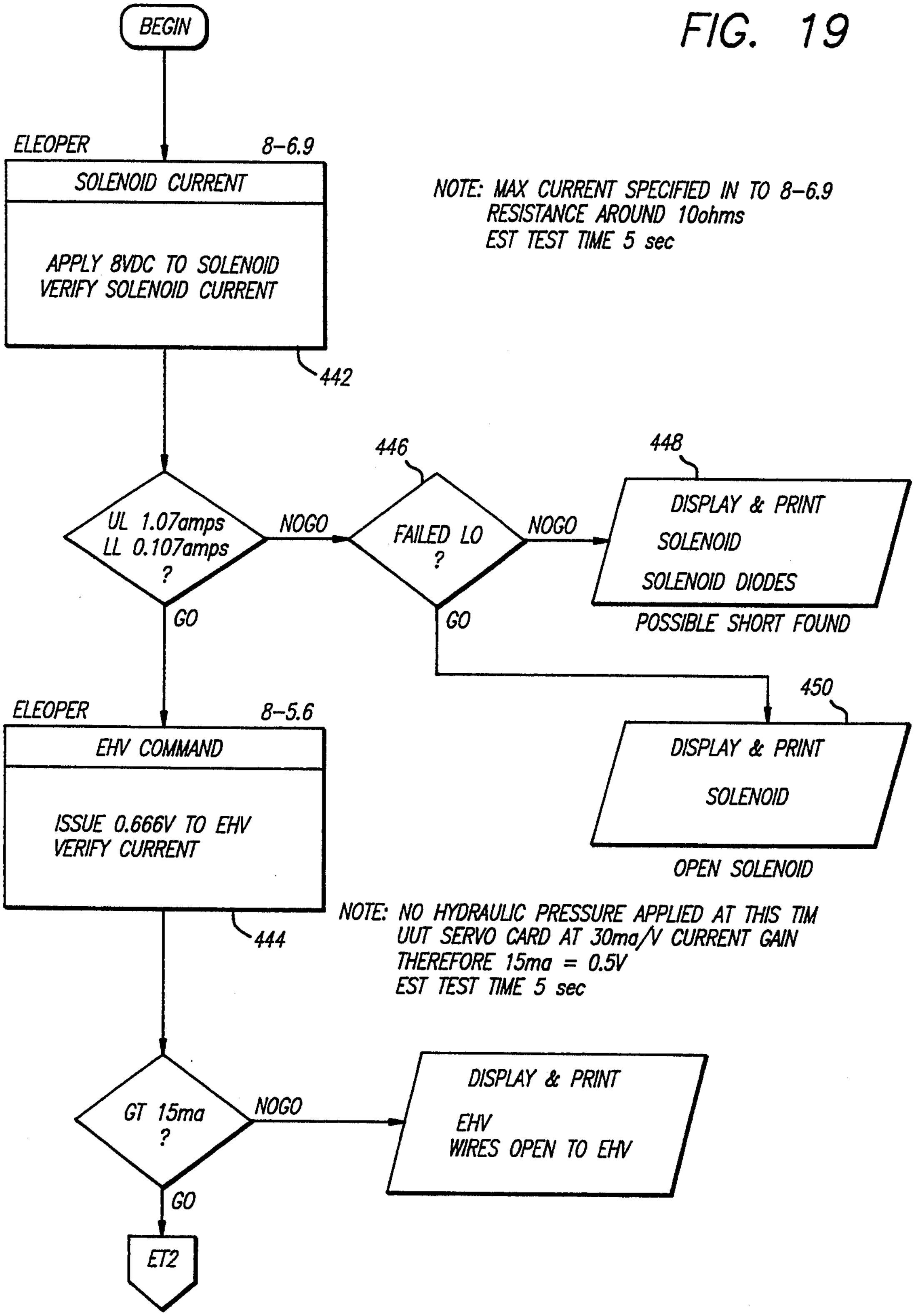

Referring now more specifically to FIGS. 18 and 19, there are illustrated flow charts showing the use of the EHVOPER 311 test (FIG. 10) on two different instances. In FIG. 18 the EHVOPER test is used on a specific instance of a stabilator having a multi LVDT feedback whereas in FIG. 19 the specific instance is a rotary rudder having a single LVDT feedback. The multi LVDT feedback servocontrol circuit is shown in FIG. 12, the UUT test 310 in FIG. 10 and the multi LVDT feedback servocontrol test 298 is shown in FIG. 9. These flow charts are illustrative of the fact that a specific test does not "know" what UUT or device it is being run with respect to. Rather, when a specific test is required for a UUT, that test is called out in the test program at the appropriate position and the test sequence is executed.

As is shown in FIG. 18 at 430, the voltage is removed from the solenoid diode and the back EMF voltage is measured to determine whether or not it is within the limits upper (UL) of $-10$ volts and the lower (LL) of $-43$ volts. If such is within those limits, then the test sequences to the next step as shown at 432 wherein a command voltage of 0.666V is applied to the electrohydraulic valve A (EHVA) and the current is measured. If the current is greater than (GT) 15 milliamperes as required, then the test sequences to its next step as shown at 434. At this step the 0.666V command signal is applied to the electrohydraulic valve B (EHVB) and the current is measured. If the measurement is correct at or greater than (GT) 15 milliamperes the test is satisfactory and the test program manager sequences to the next test. If, however, the back EMF voltage is outside limits, a no-go is issued and it is displayed and printed that the solenoid B diodes are defective as shown at 436. If the electrohydraulic valve A current is improper, then a no-go is issued and there is displayed and printed as shown at 438, EHVA, wires open to EHVA. Additionally, if the voltage as EHVB is incorrect, then there will be displayed and printed as shown at 440 that the EHVB is inoperative and that wires are open to it.

As shown in FIG. 19, there is a test directed to the rotary rudder on an aircraft and as shown at 442, a voltage of 8 volts d.c. is applied to the solenoid and the current is measured. If it is within the upper limit (UL) of 1.07 amps and the lower limit (LL) of 0.107 amps, the test sequences to the next step as shown at 444 where as with the stabilator test (FIG. 17) a command of 0.666 volts is applied to the electrohydraulic valve (EHV) and the current is verified. If the current is greater than (GT) 15 milliamperes as required, the test is satisfactorily completed and the test program manager sequences to the next step.

If, however, the solenoid current was outside the limits as specified, then the test is a no-go at this point and as shown at 446, if the failure was low, that is less than 0.107 amps, then there would be a display and print that the solenoid or the solenoid diode was defective and that there is possibly a short. If the failure was high, then there would be displayed and printed as shown at 450 that the solenoid failed and that it is probably open.

By way of further clarification, a specific example will now be discussed setting forth the steps utilizing the computer controlled automatic test equipment of the present invention in conducting a test on a specific UUT. It will be assumed that the UUT to be tested is a stabilator for a specific aircraft and that the stabilator in this case has been identified as STAB-F 19. Other UUTs will be identified by specific titles as well.

The specific UUT identified as the STAB-F 19 is installed on the hydraulic console fixture as shown at 36 in FIG. 3 with attachments being made by way of appropriate conduits between the UUT and the hydraulic ports 42 as well as the appropriate electrical connections. The operator then calls up on the CRT 28 screen a menu of all of the test programs available to conducted. Among those will be the STAB-F 19 test program. The operator then indicates to the system that the STAB-F 19 test program is to be conducted At this point there appears on the screen a list of tests that are applicable to the STAB-F 19 UUT. The operator at this point may elect to conduct any one of the tests set forth on the list, or alternatively, may elect to have the automatic test equipment sequentially conduct each of the tests in order as they appear on the list without further intervention by the operator. It is here assumed that the operator chooses to have all the tests run automatically. Assuming that the first test on the list of tests to be conducted for the STAB-F 19 is a frequency response test as shown at 313 in FIG. 13, there will be a pointer (an address) identifying where in memory that particular test sequence resides. Each item in the list will similarly contain a pointer to the specific address for that test sequence. The test sequence, as thus identified, will then be conducted automatically.

When the frequency response 313 test is addressed, it will contain portions from the test 308, the UUT test 312 as well as the frequency response test 313. The UUT test will include a pointer (an address) to the UUT which will in turn identify the STAB-F 19 as the UUT. The UUT STAB-F 19 will in turn contain a plurality of pointers (addresses) to various of the devices 258 (FIG. 7) which are to be utilized with a UUT 264 (FIG. 7) such for example as the hydraulic ports 42 or the servocontrol devices as shown in FIG. 9, or the like.

It will thus be seen that when the operator chooses the STAB-F 19 test program to be conducted on the STAB-F 19 UUT, the test program 300 specifies the test sequence which in turn specifies the specific test for the STAB-F 19 stabilator which includes and inherits from the UUT test 312 the frequency response general purpose test 313 and utilizes the specific instance definitions for the STAB-F 19. The UUT test will in turn include a pointer (an address) to the UUT 314 which will in turn include a pointer (an address) through the appropriate I/O 257 (FIG. 7) to specific hydraulic ports for connection with the STAB-F 19 UUT to be tested.

When the UUT test for the STAB-F 19 is being conducted, as above referred to, the servocontrol will be identified as one of the devices to be used. Since the STAB-F 19 is the UUT, the multi LVDT feedback servocontrol 298 (FIG. 9) is a device which will be utilized. As a result, there will be a pointer (an address) to the servocontrol device since the multi LVDT feedback servocontrol is included as a part of the STAB-F 19 test. Through the inheritance hierarchy, the test will include the device 280, the servocontrol 282, UUT servocontrol 288, LVDT feedback servocontrol 294, the multi LVDT feedback servocontrol 298 as well as the specific definitions for the instance of the STAB-F 19 stabilator. When the specific test and the specific devices, as above described, have been appropriately selected as a result of the various commands given in the sequencing of the test on the STAB-F 19 stabilator, then specific values are automatically assigned to each of the characteristics or parameters which definitions or values are unique to the STAB-F 19 stabilator. It is these specific values which provide the specific parameters against which the STAB-F 19 is tested, for example, as shown in the flow charts above described specifically with respect to FIGS. 18 and 19.

Once the STAB-F 19 test program has been conducted on the specific stabilator which is attached to the hydraulic console and the test is fully completed, then the specific values for that particular test program are no longer needed and are automatically eliminated from the test program. It is, however, to be clearly understood that the various hierarchies for that test such as the test, UUT test, frequency response and the like or the device, servocontrol, UUT servocontrol, LVDT feedback and multiple LVDT feedback as above described, are not destroyed but remain in the system for use with regard to future testing when a specific instance of a UUT is declared by the operator's selection of the particular test for that UUT.

There has thus been disclosed a plurality of tests which may be applied to both the automatic test equipment and to units under tests as desired for any particular point in the testing procedures. In each instance, there is developed an abstract class of characteristics and functions which are applicable to all devices which fall within the particular group under consideration. One or more subclasses of such characteristics and functions may also be provided which are applicable to some but not all of the devices under consideration. When a specific instance of a device is declared, such as a specific servoactuator, for example such as a stabilator on an aircraft, then the characteristics and functions previously defined for the abstract class and subclasses, are inherited into the specific instance as declared to thereby define the characteristics for the specific device which has been declared. The test program manager will then sequence a series of tests applicable to the specific instance as declared to determine whether or not the device as declared is operable. If the device fails at any specific level, the test may then sequence to a diagnostic test to ascertain the manner in which the particular test step failed along with a printout as to the probable cause of the failure. Other operations may also be suggested such as adjustments, disassembly and reassembly or the like depending upon the particular type of failure which has occurred.

Those skilled in the art will recognize that through the utilization of the particular architecture of software as described herein, there is no requirement, as has been the case in the prior art, to list all of the characteristics and functions for each device which is to be tested in order to provide a means for testing the same in a computer controlled automatic test equipment. Rather, characteristics applicable to all devices within a group can be inherited into specific instances when they are declared to provide this information. When the test is completed, the specific instances containing definitions for the characteristics and functions for that instance are no longer needed and are "destroyed". However, the group characteristics are retained and can be used at a later time when tests are to be conducted on other devices.

What is claimed is:

1. A method for automatically testing electrohydraulic/pneumatic hardware comprising:
   (A) providing an abstract base class defining a plurality of characteristic data and functions common to all of a plurality of predetermined units to be tested;
   (B) providing at least one subclass defining a plurality of characteristic data and functions specific to a predetermined type of unit to be tested but not all of such units;
   (C) defining specific characteristic data and functions unique to a specific unit of said type of unit;
   (D) declaring said specific unit of said type of unit for testing (UUT);
   (E) inheriting into said specific characteristic data and functions said plurality of characteristic data and functions from said abstract base class;
   (F) inheriting into said specific characteristic data and functions said plurality of characteristic data and functions from said at least one subclass;
   (G) activating a test program for said declared UUT;
   (H) measuring the results of said test program;
   (I) comparing said results of said test programs with said specific and inherited at least one subclass and abstract base class characteristic data and functions; and
   (J) reporting whether said UUT test results fall within said specific and inherited at least one subclass and abstract base class characteristic data and functions.

2. A method as defined in claim 1 wherein said test program includes a base class test program defining a plurality of test steps common to all UUT devices of the type including the declared UUT and a specific class test program defining a plurality of test steps unique to said declared UUT, and inheriting said common test steps into said unique test steps for testing said declared UUT.

3. A method as defined in claim 2 which further includes the step of deactivating said test program upon completion of said test program on said declared UUT.

4. A method as defined in claim 2 wherein at least one of said plurality of test steps points to and incorporates a further test step applicable to said declared UUT.

5. A method as defined in claim 2 which further includes the steps of isolating a test step wherein a failure has occurred and performing a diagnostic test to ascertain the probable cause of said failure.

6. A method as defined in claim 5 which further includes the step of printing the results of said diagnostic test.

7. A method as defined in claim 1 which further includes the steps of:
   (A) providing a hydraulic console;
   (B) providing an electronic console;
   (C) interconnecting said electronic and hydraulic console;
   (D) attaching said UUT to said hydraulic console; and
   (E) activating selected portions of said electronic and hydraulic consoles for performing said test program on said UUT.

8. A method as defined in claim 1 wherein said specific characteristics unique to a specific unit define data and functions which are descriptive of said declared UUT.

9. A method as defined in claim 8 wherein said declared UUT is a device contained within a test system.

10. A method as defined in claim 8 wherein said declared UUT is a device external to a test system.

11. Apparatus for automatically testing hydraulic/pneumatic devices comprising:
   (A) a hydraulic/pneumatic console;
   (B) an electronic control console;
   (C) means for interconnecting said hydraulic/pneumatic console and said electronic control console;
   (D) said electronic control console including digital computer means having memory means;
   (E) first means for storing in said memory means an abstract base class defining a plurality of characteristic data and functions common to each of a plurality of predetermined units to be tested;
   (F) second means for storing in said memory means at least one subclass defining a plurality of characteristic data and functions specific to a predetermined type of unit to be tested;
   (G) means in said computer for combining said abstract base class and said at least one subclass to define a specific unit to be tested;
   (H) third means in said memory means for storing a test program applicable to said specific unit to be tested;
   (I) means for removably attaching a unit to be tested to said hydraulic/pneumatic console;
   (J) means for activating said test program to test said specific unit to be tested; and
   (K) means for indicating the results of said test program on said specific unit to be tested.

12. Apparatus as defined in claim 11 wherein said electronic control console includes circuit means for testing feedback in a unit to be tested, said circuit means including a plurality of different feedback circuit means, a command circuit for applying a command signal to said unit to be tested, means for enabling selected feedback circuit means, and summing means for incorporating signals in said enabled selected feedback circuit means into said command signal.

13. Apparatus as defined in claim 12 wherein said feedback circuit means includes an Linear Variable Differential Transformer (LVDT) feedback circuit.

14. Apparatus as defined in claim 12 wherein said feedback circuit means includes a linear encoder.

* * * * *